United States Patent
Ozturk et al.

(10) Patent No.: US 12,349,052 B2
(45) Date of Patent: Jul. 1, 2025

(54) UE ASSISTANCE INFORMATION FOR SLICES

(71) Applicant: QUALCOMM Incorporated, San Diego, CA (US)

(72) Inventors: Ozcan Ozturk, San Diego, CA (US); Luis Fernando Brisson Lopes, Swindon (GB); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/819,916

(22) Filed: Aug. 15, 2022

(65) Prior Publication Data

US 2023/0053377 A1    Feb. 23, 2023

Related U.S. Application Data

(60) Provisional application No. 63/235,654, filed on Aug. 20, 2021.

(51) Int. Cl.
*H04W 48/18* (2009.01)
*H04W 72/56* (2023.01)

(52) U.S. Cl.
CPC .......... *H04W 48/18* (2013.01); *H04W 72/56* (2023.01)

(58) Field of Classification Search
None
See application file for complete search history.

(56) References Cited

U.S. PATENT DOCUMENTS

2019/0159119 A1* 5/2019 Djordjevic ............ H04W 48/18
2020/0205205 A1* 6/2020 Ha ........................ H04W 4/80

FOREIGN PATENT DOCUMENTS

| EP | 3512272 A1 | 7/2019 |
| EP | 3622744 A1 | 3/2020 |
| EP | 3629614 A2 | 4/2020 |
| WO | 2020252281 A1 | 12/2020 |

OTHER PUBLICATIONS

International Search Report and Written Opinion—PCT/US2022/040510—ISA/EPO—Nov. 28, 2022 17 pages.

* cited by examiner

*Primary Examiner* — Frantz Bataille
(74) *Attorney, Agent, or Firm* — Procopio, Cory, Hargreaves & Savitch

(57) ABSTRACT

Aspects present herein relate to methods and devices for wireless communication including an apparatus, e.g., a UE. The apparatus may transmit, to at least one of a network node or a network entity, an indication of one or more future network slices, an indication of one or more current network slices, and/or an indication of one or more past network slices, the future network slices corresponding to network slices for potential future use by the UE, the current network slices corresponding to network slices that are currently used by the UE, the past network slices corresponding to network slices that were previously used by the UE. The apparatus may also receive, from the network entity, a response to the indication of the one or more future network slices, the indication of the one or more current network slices, and/or the indication of the one or more past network slices.

30 Claims, 16 Drawing Sheets

UE ASSISTANCE INFORMATION FOR SLICES

CROSS REFERENCE TO RELATED APPLICATION(S)

This application claims the benefit of and priority to U.S. Provisional Application Ser. No. 63/235,654, entitled "UE ASSISTANCE INFORMATION FOR SLICES" and filed on Aug. 20, 2021, which is expressly incorporated by reference herein in its entirety.

TECHNICAL FIELD

The present disclosure relates generally to communication systems, and more particularly, to user equipment (UE) assistance information in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may store a history of usage of one or more past network slices prior to transmitting an indication of one or more past network slices. The apparatus may also calculate a probability of usage of one or more future network slices prior to transmitting an indication of one or more future network slices. Additionally, the apparatus may transmit, to at least one of a network node (e.g., a base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE. The apparatus may also receive, from the network entity, a response to at least one of the indication of the one or more future network slices, the indication of the one or more current network slices, or the indication of the one or more past network slices. The apparatus may also transmit, to the network node (e.g., a base station) based on the response, a message associated with at least one of the one or more future network slices, the one or more current network slices, or the one or more past network slices.

In another aspect of the disclosure, a method, a computer-readable medium, and an apparatus are provided. The apparatus may be a network entity. The apparatus may receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE. The apparatus may also transmit, to the at least one UE, a response to at least one of the indication of the one or more future network slices, the indication of the one or more current network slices, or the indication of the one or more past network slices. Further, the apparatus may transmit, to at least one network node (e.g., a base station), network slice selection assistance information (NSSAI) based on at least one of the indication of the one or more future network slices, the indication of the one or more current network slices, or the indication of the one or more past network slices. The apparatus may also configure a network slice structure based on at least one of the one or more future network slices, the one or more current network slices, or the one or more past network slices.

In another aspect of the disclosure, a method, a computer-readable medium, and an apparatus are provided. The apparatus may be a network node (e.g., a base station). The apparatus may receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE. The apparatus may also receive, from the at least one UE, a message associated with at least one of the one or more future network slices, the one or more current network slices, or the one or more past network slices. Moreover, the apparatus may transmit, to at least one other network node (e.g., a base station), network slice selection assistance information (NSSAI) based on at least one of the indication of the one or more future network slices, the indication of the one or more current network slices, or the indication of the one or more past network slices. The apparatus may also configure at least one of a handover procedure, a redirection procedure, a serving cell change, or a cell addition for carrier aggregation (CA), the configuration being based on at least one of the one or more future network slices, the one or more current network slices, or the one or more past network slices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
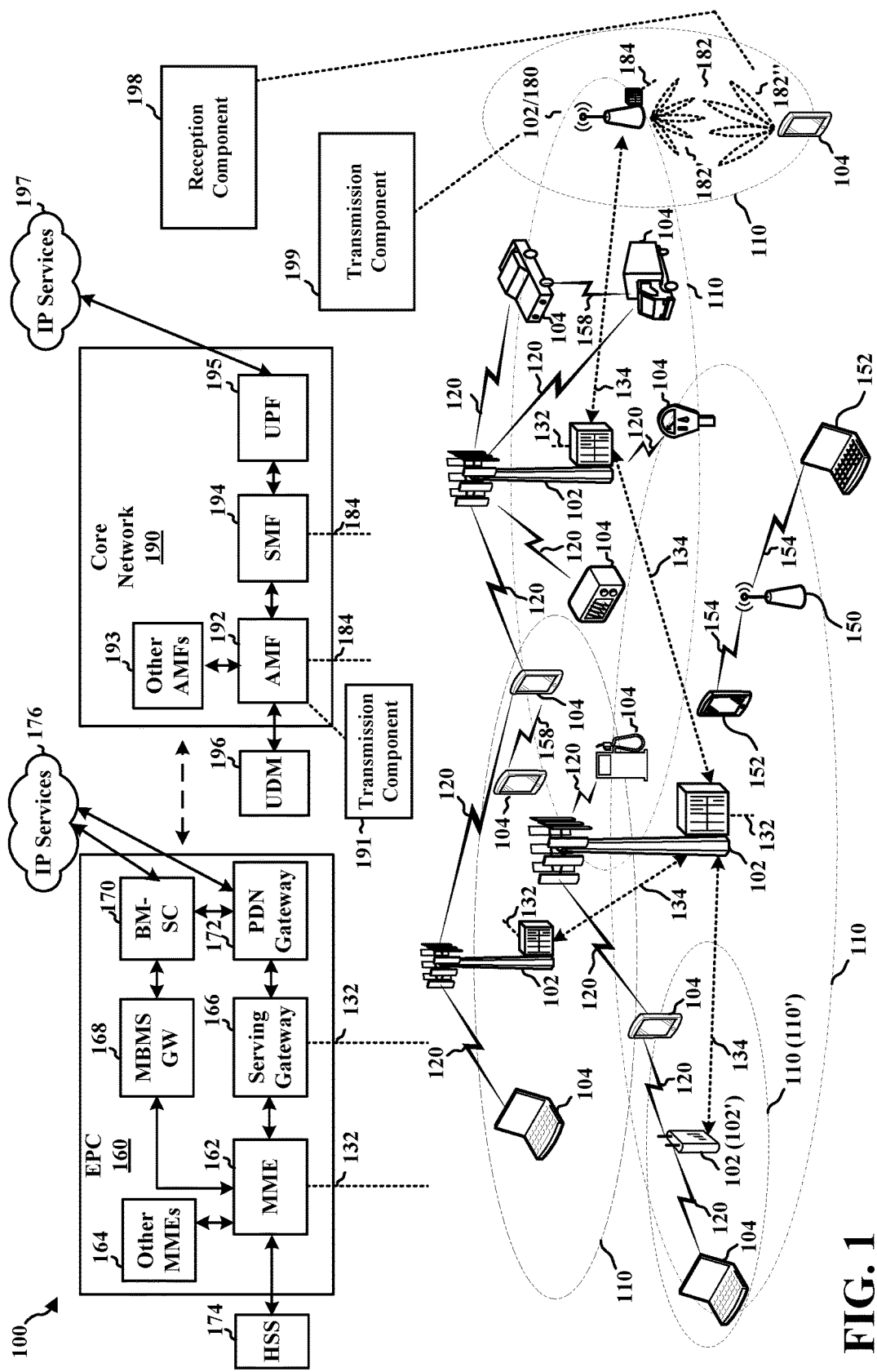
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as base station 180 (e.g., gNB) may operate in a traditional sub 6 GHz spectrum, in millimeter wave frequencies, and/or near millimeter wave frequencies in communication with the UE 104. When the base station 180 operates in millimeter wave or near millimeter wave frequencies, the base station 180 may be referred to as a millimeter wave base station. The base station 180 (e.g., millimeter wave base station) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. A network node can be implemented as a base station (i.e., an aggregated base station), as a disaggregated base station, an integrated access and backhaul (IAB) node, a relay node, a sidelink node, etc. Also, a network node can be implemented as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture or a disaggregated RAN architecture. A network entity can be implemented as a base station (i.e., an aggregated base station), as a disaggregated base station, an integrated access and backhaul (IAB) node, a relay node, a sidelink node, etc. Additionally, a network entity can be implemented as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture or a disaggregated RAN architecture. In some aspects, a network node may be referred to as a network entity.

Referring again to FIG. 1, in certain aspects, the UE 104 may include a reception component 198 configured to store a history of usage of one or more past network slices prior to transmitting an indication of one or more past network slices. Reception component 198 may also be configured to calculate a probability of usage of one or more future network slices prior to transmitting an indication of one or more future network slices. Reception component 198 may also be configured to transmit, to at least one of a network node (e.g., a base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE. Reception component 198 may also be configured to receive, from the network entity, a response to at least one of the indication of the one or more future network slices, the indication of the one or more current network slices, or the indication of the one or more past network slices. Reception component 198 may also be configured to transmit, to the network node (e.g., a base station) based on the response, a message associated with at least one of the one or more future network slices, the one or more current network slices, or the one or more past network slices.

Referring again to FIG. 1, in certain aspects, the AMF 192 may include a transmission component 191 configured to receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE. Transmission component 191 may also be configured to transmit, to the at least one UE, a response to at least one of the indication of the one or more future network slices, the indication of the one or more current network slices, or the indication of the one or more past network slices. Transmission component 191 may also be configured to transmit, to at least one network node (e.g., a base station), network slice selection assistance information (NSSAI) based on at least one of the indication of the one or more future network slices, the indication of the one or more current network slices, or the indication of the one or more past network slices. Transmission component 191 may also be configured to configure a network slice structure based on at least one of the one or more future network slices, the one or more current network slices, or the one or more past network slices.

Referring again to FIG. 1, in certain aspects, the base station 180 (e.g., a network node) may include a transmission component 199 configured to receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE. Transmission component 199 may also be configured to receive, from the at least one UE, a message associated with at least one of the one or more future network slices, the one or more current network slices, or the one or more past network slices. Transmission component 199 may also be configured to transmit, to at least one other network node (e.g., a base station), network slice selection assistance information (NSSAI) based on at least one of the indication of the one or more future network slices, the indication of the one or more current network slices, or the indication of the one or more past network slices. Transmission component 199 may also be configured to configure at least one of a handover procedure, a redirection procedure, a serving cell change, or a cell addition for carrier aggregation (CA), the configuration being based on at least one of the one or more future network slices, the one or more current network slices, or the one or more past network slices.

Although the following description may be focused on 5G NR, the concepts described herein may be applicable to other similar areas, such as LTE, LTE-A, CDMA, GSM, and other wireless technologies.

Figure 2:
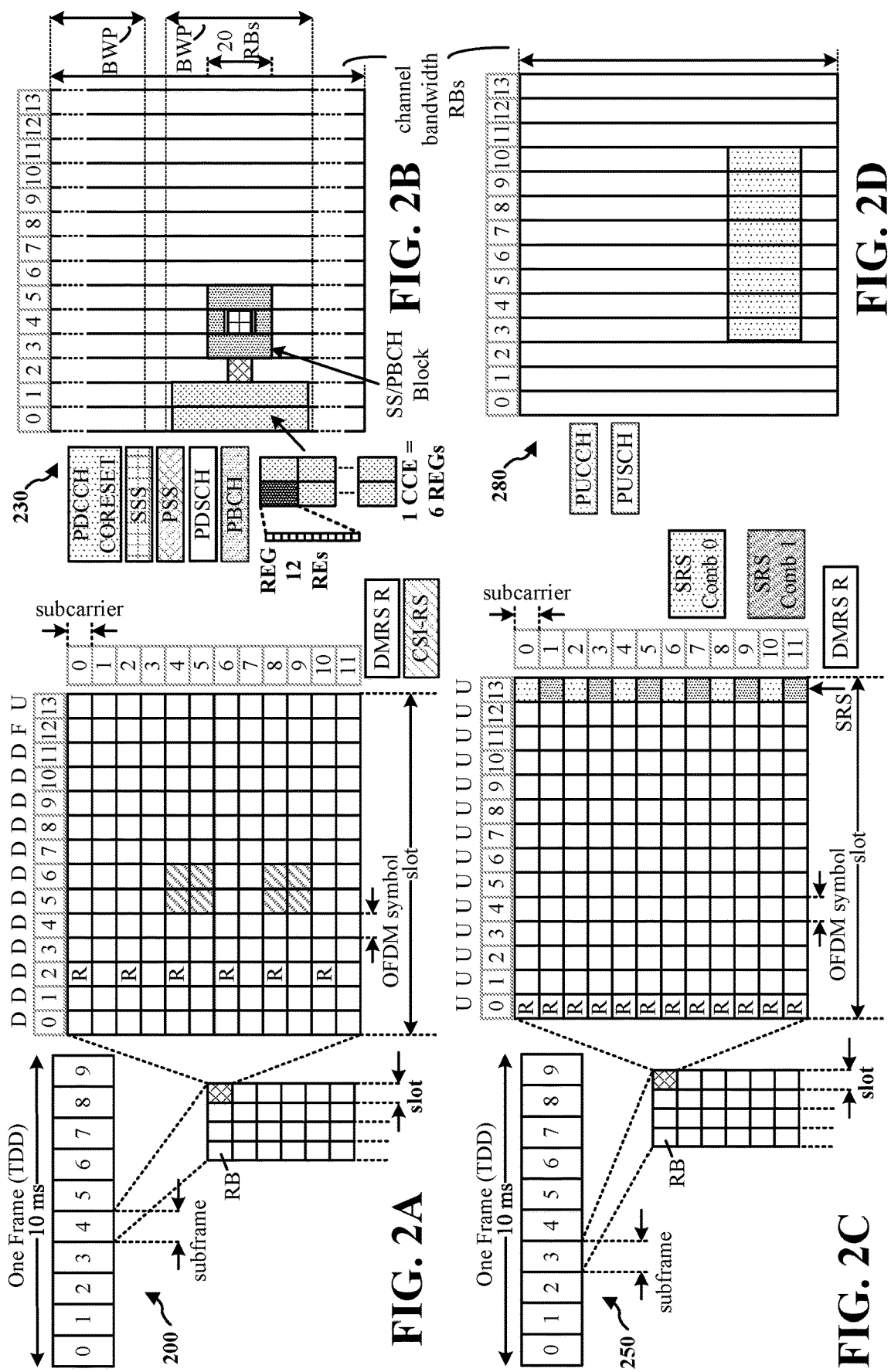
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and 2 slots/subframe. The subcarrier spacing may be equal to 2*15 kHz, where y is the numerology 0 to 4. As such, the numerology p=0 has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
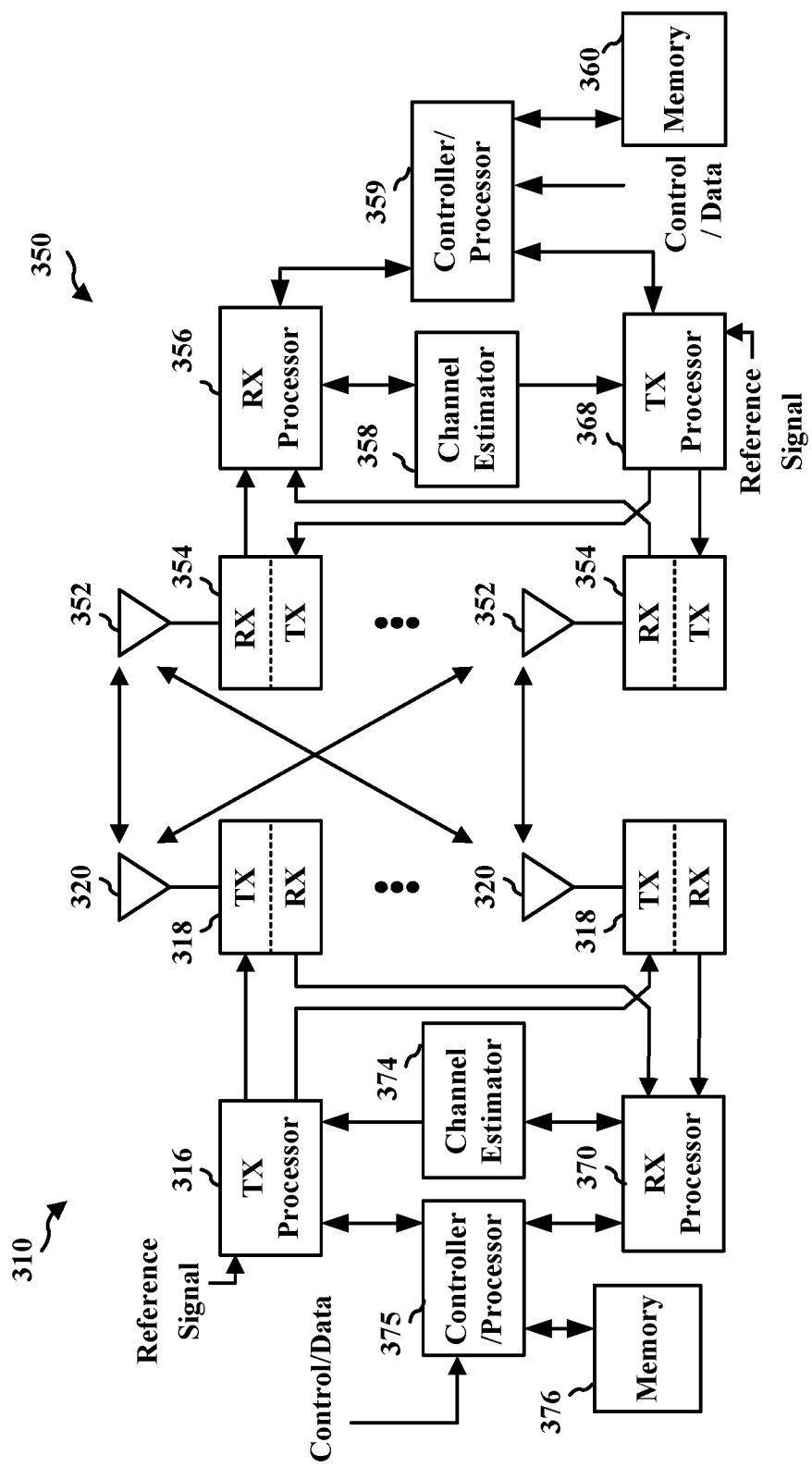
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via a separate transmitter (TX) 354. Each transmitter (TX) 354 may modulate an RF carrier with a respective spatial stream for transmission.

The UL transmission is processed at the base station 310 in a manner similar to that described in connection with the receiver function at the UE 350. Each receiver (RX) 318 receives a signal through its respective antenna 320. Each receiver (RX) 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

At least one of the TX processor 316, the RX processor 370, and the controller/processor 375 may be configured to perform aspects in connection with 191 of FIG. 1.

Some aspects of wireless communication, e.g., a 5G system (5GS), may utilize a network slicing feature. Network slicing is type of a network architecture that may enable the multiplexing of independent logical networks on a physical network infrastructure. For instance, each network slice may be an isolated end-to-end network that may fulfill specifications requested by an application. Network slicing may provide a means for a user equipment (UE) and a network, e.g., a network entity and/or a network node, to negotiate a specific type of service, which may be part of an expected set of specifications for the UE and the network. Additionally, network slices may differ for different types of supported features and/or network function optimizations. For example, a network operator may deploy multiple network slice instances that deliver the same features for different groups of UEs, e.g., as these network slice instances may deliver a different committed service and/or because they may be dedicated to a certain customer. A network slice framework may include a general architecture that maps the common elements into a general and unified framework. For instance, a network slicing architecture may correspond to two mains blocks, e.g., one block dedicated to the actual slice implementation and the other block dedicated to the slice management and configuration.

Figure 4:
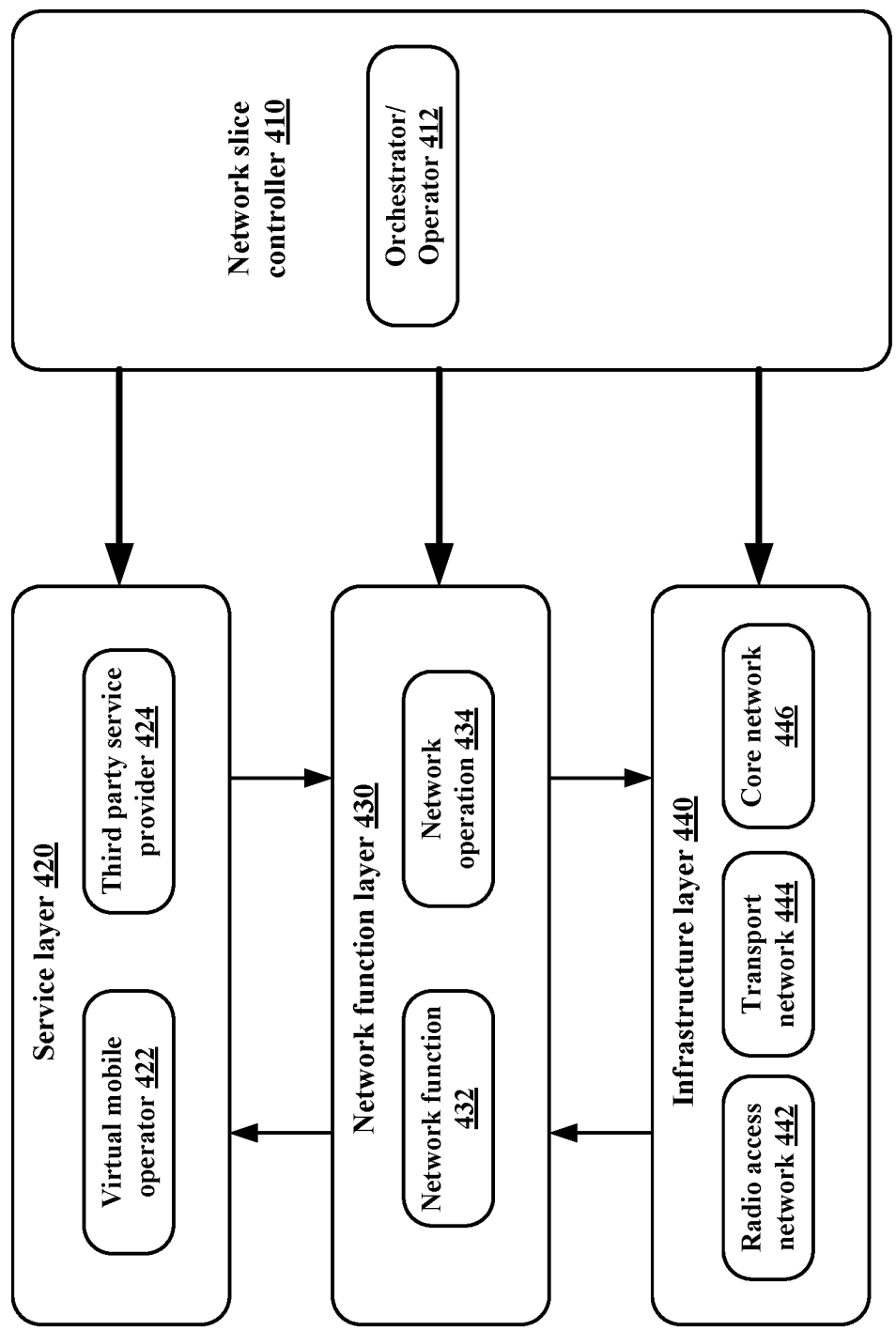
FIG. 4 is a diagram illustrating an example of a network slice framework.

FIG. 4 illustrates a diagram 400 of one example of a network slice framework. More specifically, diagram 400 is an example network slice framework including network slice controller 410, service layer 420, network function layer 430, and infrastructure layer 440. As shown in FIG. 4, network slice controller 410 includes orchestrator/operator 412, service layer 420 includes virtual mobile operator 422 and third party service provider 424, network function layer 430 includes network function 432 and network operation 434, and infrastructure layer 440 includes radio access network (RAN) 442, transport network 444, and core network (CN) 446.

As indicated in FIG. 4, the network slice framework in diagram 400 includes one aspect dedicated to the actual slice implementation (e.g., service layer 420, network function layer 430, and infrastructure layer 440) and another aspect dedicated to the slice management and configuration (e.g., network slice controller 410). The service layer 420 may interface directly with the network business entities (e.g., virtual mobile operator 422 and third party service provider 424) that share the underlying physical network and provide an indication of service specifications. The network function layer 430 may be in charge of the creation of each network slice according to service instance requests from the upper layer, as well as be composed of a set of network functions/operations, e.g., network function 432 and network operation 434. The infrastructure layer 440 may represent the actual physical network topology (e.g., RAN 442, transport network 444, and CN 446) upon which each network slice is multiplexed and provide physical network resources to host the several network functions composing each slice. Additionally, the network slice controller 410 may include a network orchestrator/operator 412, which interfaces with the various functionalities performed by each layer to manage each slice request.

In some aspects, a single UE may simultaneously be served by one or more network slice instances via an access network, e.g., a 5G access network (5G-AN). The network entity, e.g., an access and mobility management function (AMF), that is serving the UE may belong to each of the network slice instances serving the UE. That is, an AMF instance may be common to the network slice instances that are serving a UE. A protocol data unit (PDU) session may belong to one specific network slice instance per network, e.g., a public land mobile network (PLMN). Also, different network slice instances may not share a PDU session, although different slices may have slice-specific protocol data unit (PDU) sessions using a same data network name (DNN).

In some instances, a UE may be configured by a certain type of PLMN, e.g., a home PLMN (HPLMN), with configured network slice selection assistance information (NSSAI) per PLMN. Also, configured NSSAI may be PLMN-specific and the HPLMN may indicate to what PLMN(s) each configured NSSAI applies, including whether the configured NSSAI applies to all PLMNs. That is, the configured NSSAI may convey the same information regardless of the PLMN that the UE is accessing, e.g., this may be possible for NSSAIs containing standardized single NSSAIs (S-NSSAIs).

Additionally, when providing a requested NSSAI to the network upon registration, the UE in a particular PLMN may use S-NSSAIs belonging to the configured NSSAI, if any, of that particular PLMN. Upon successful completion of a UE's registration procedure, the UE may obtain, from an AMF, an allowed NSSAI for the PLMN. This allowed NSSAI may include one or more S-NSSAIs. Further, the allowed NSSAI may take precedence over the configured NSSAI for this PLMN. The UE may use the S-NSSAIs in the allowed NSSAI corresponding to a network slice for the subsequent network slice selection related procedures in the serving PLMN. This may be referred to as accepted NSSAI. Moreover, for each PLMN, the UE may store the configured NSSAI and, if any, the allowed NSSAI. When the UE receives allowed NSSAI for a PLMN, it may store the allowed NSSAI and override any previously stored allowed NSSAI for the PLMN.

Figure 5:
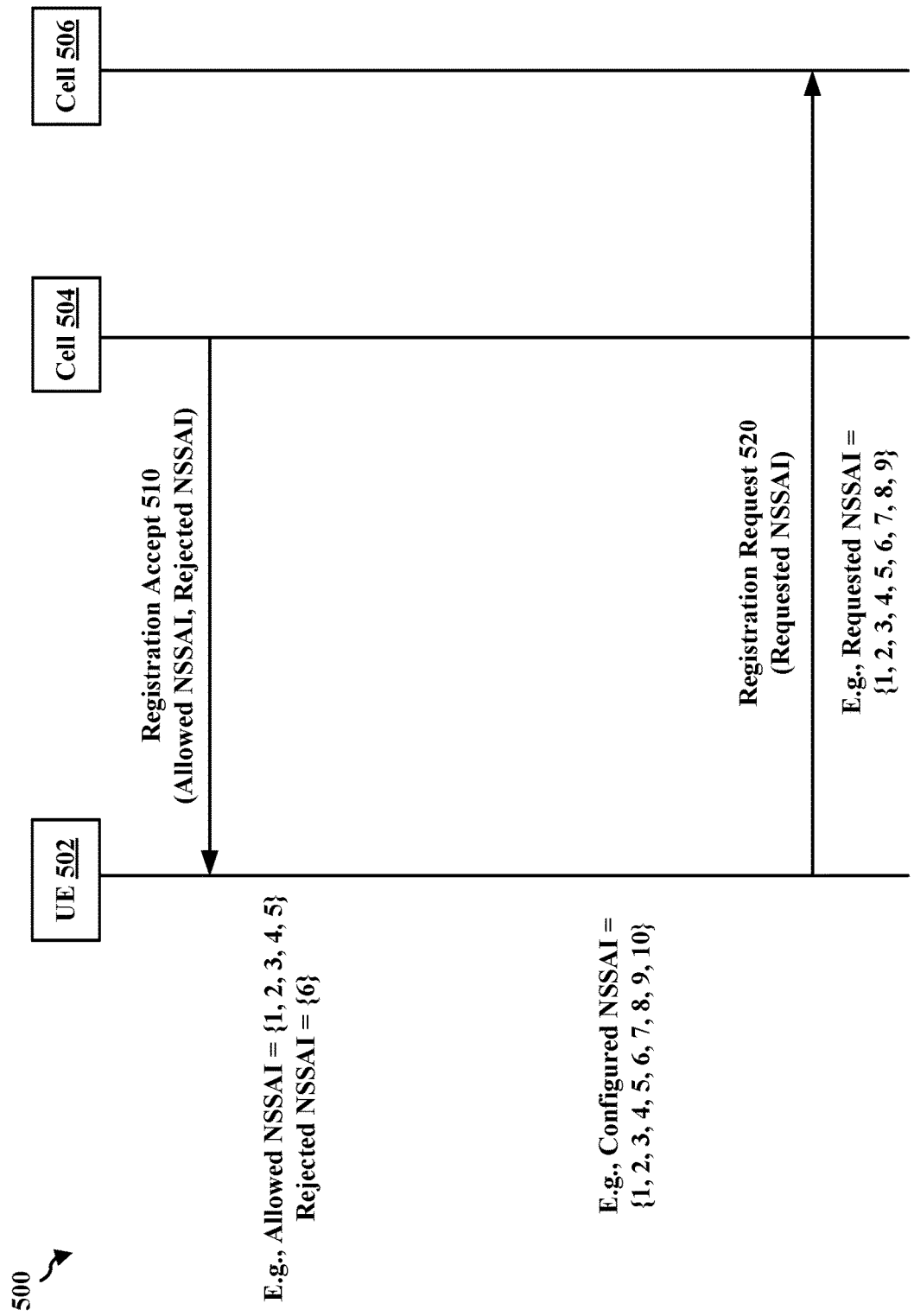
FIG. 5 is a diagram illustrating an example of a registration procedure.

FIG. 5 illustrates a diagram 500 of one example of a registration procedure. More specifically, diagram 500 is an example registration procedure that utilizes network slice selection assistance information (NSSAI). As shown in FIG. 5, diagram 500 includes UE 502, cell 504, and cell 506. As illustrated in FIG. 5, cell 504 may send a registration accept message, e.g., registration accept 510, to UE 502 that includes allowed NSSAI and rejected NSSAI. For example, the allowed NSSAI may correspond to values of {1, 2, 3, 4, 5} and the rejected NSSAI may correspond to a value of {6}. Additionally, the UE 502 may send a registration request message, e.g., registration request 520, to cell 506 that includes requested NSSAI. For example, requested NSSAI may correspond to values of {1, 2, 3, 4, 5, 6, 7, 8, 9} and configured NSSAI may correspond to values of {1, 2, 3, 4, 5, 6, 7, 8, 9, 10}.

Figure 6:
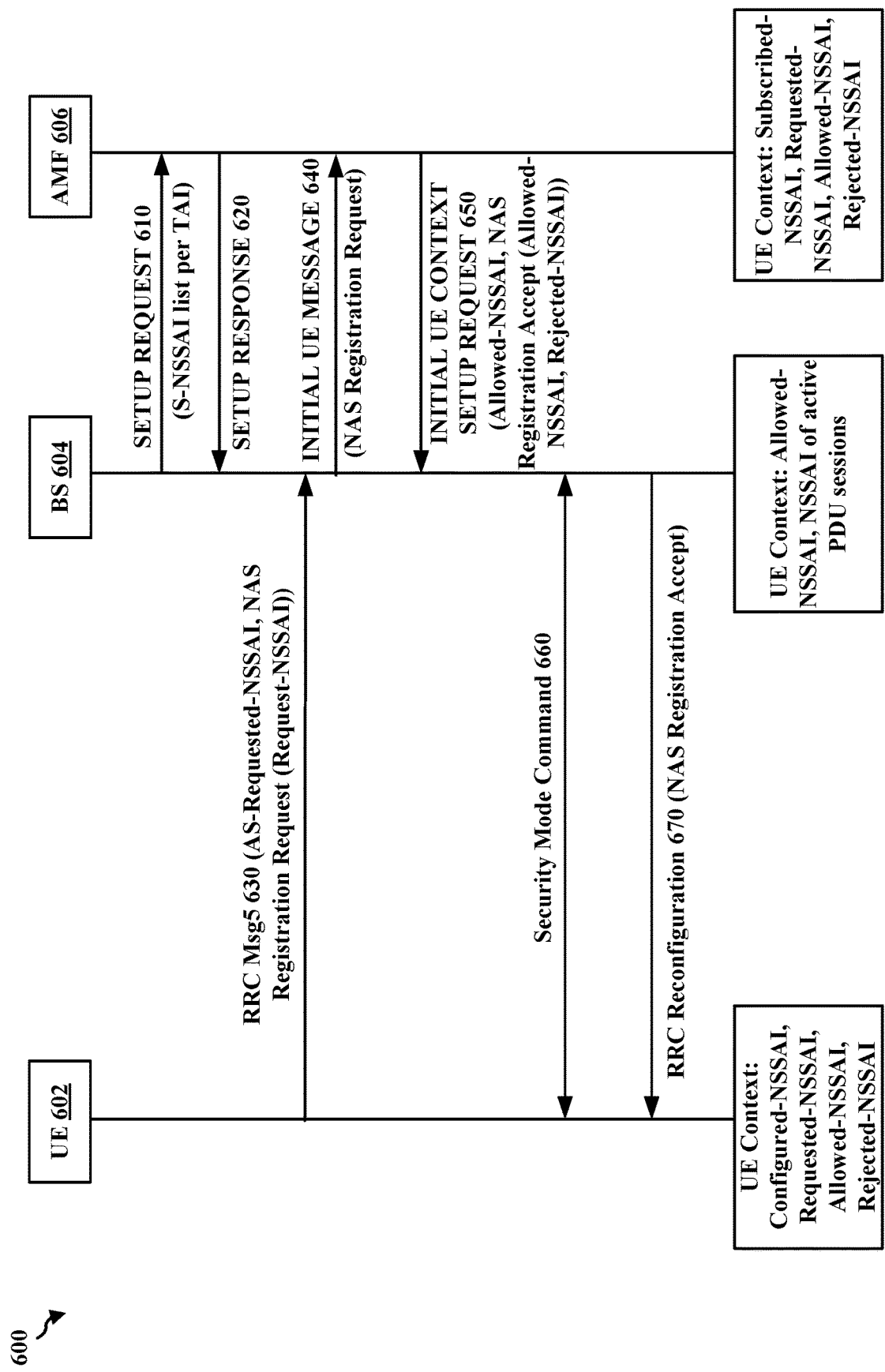
FIG. 6 is a diagram illustrating an example of a registration procedure.

FIG. 6 illustrates a diagram 600 of one example of a registration procedure. More specifically, diagram 600 is an example non-access stratum (NAS) registration procedure that utilizes network slice selection assistance information (NSSAI). As shown in FIG. 6, diagram 600 includes UE 602, base station (BS) 604 (e.g., a network node), and AMF 606 (e.g., a network entity). As illustrated in FIG. 6, base station 604 may send a setup request message 610 (including an S-NSSAI list per tracking area identity (TAI)) to AMF 606, and AMF 606 may send a setup response message 620 to base station 604. UE 602 may send an RRC message 5 (Msg5) (including AS-Requested-NSSAI and a NAS registration request message (Request-NSSAI)) (e.g., RRC Msg5 630) to base station 604. Base station 604 may then send an initial UE message 640 (including a NAS registration request) to AMF 606. AMF 606 may send an initial UE context setup request 650 (including Allowed-NSSAI, NAS Registration Accept (Allowed-NSSAI, Rejected-NSSAI)) to base station 604. Next, a security mode commend procedure 660 may be performed between UE 602 and base station 604. Base station 604 may then transmit an RRC reconfiguration message 670 (including a NAS registration accept message) to UE 602. The UE context associated with the UE 602 may include Configured-NSSAI, Requested-NSSAI, Allowed-NSSAI, and Rejected-NSSAI. The UE context associated with the base station 604 may include Allowed-NSSAI and NSSAI of active PDU sessions. Also, the UE context associated with the AMF 606 may include Subscribed-NSSAI, Requested-NSSAI, Allowed-NSSAI, and Rejected-NSSAI.

As indicated in FIGS. 5 and 6, when a UE registers or participates in a registration procedure, it may send a request for network slices via requested NSSAI. However, the UE may want to use other network slices (i.e., non-requested network slices) in the future. There may also be network slices that are often used by the UE, but these particular network slices may not be needed during the registration process. In such cases, it may be beneficial for the network to determine this information which may be used in mobility decisions and other network-based actions. That is, it may be beneficial for a UE/network to determine network slices that have been used in the past and network slices that may be used in the future. For instance, it may be beneficial for a UE/network to determine network slices that have been used in the past, but may not be needed in the future, or vice versa. It may also be beneficial to exchange such information between a UE and a network entity (e.g., an AMF) or a network node (e.g., base station).

Aspects of the present disclosure may determine or identify network slices that have been used in the past and network slices that may be used in the future. For instance, aspects of the present disclosure may allow a UE/network to use this information in mobility decisions and other network-based actions. Additionally, aspects of the present disclosure may allow a UE/network to determine network slices that have been used in the past, but may not be needed in the future, or vice versa. Aspects of the present disclosure may also exchange such information between a UE and a network entity (e.g., an AMF) or a network node (e.g., base station). For example, a UE may transmit an indication of future network slices, and indication of current network slices, and/or an indication of past network slices to a network entity (e.g., an AMF) or a network node (e.g., base station).

In some instances, aspects of the present disclosure may allow a UE to signal one or more network slices that may be used in the future (i.e., future network slices), one or more network slices that are currently being used (i.e., current network slices), and/or one or more network slices that were previously used in the past (i.e., past network slices). This signaling may be performed with an indication of the future network slices, indication of the current network slices, and/or an indication of the past network slices. Additionally, the future network slices, current network slices, and/or past network slices may be signaled in a separate list other than requested NSSAI. For example, the separately signaled list may be referred to as a wish list NSSAI (Wishlist NSSAI) or updated requested NSSAI. Further, the future network slices, current network slices, and/or past network slices may be signaled in requested NSSAI with an assigned probability. For instance, the future network slices may be signaled with an assigned probability for future use (e.g., a value of 1.0 may correspond to an immediate use of the network slices). Moreover, the list may be signaled per public land mobile network (PLMN).

In some aspects, a UE may signal the future network slices, current network slices, and/or past network slices in an RRC message (e.g., an RRC complete message) to a network entity (e.g., an AMF) and/or a network node (e.g., a base station or a gNB). For example, the UE may signal a registration request and/or a service request to an AMF. Also, the UE may indicate a probability of usage of the future network slices and/or a history of the usage of the past network slices. For example, the probability of usage of the future network slices may be a value between 0 and 100, where 100 means extreme likelihood of future usage and 0 means no likelihood of future usage, or a decimal between 0 and 1. The history of usage of the past network slices may be the number of times network slices were used in a given past duration. For example, the history of usage of the past network slices may include how many times and/or how long the past network slices were utilized in the last X hours. The history of usage of the past network slices may include a number between 0 and 100, where 100 means heavy usage in the past and 0 means no usage in the past. Moreover, a weight factor and/or priority index may be attached to each of the past network slices, each of the current network slices, and/or each of the future network slices. The weight factor and/or priority index may reflect the relative importance of each of the past network slices, current network slices, and/or future network slices. For example, the weight factor and/or priority index may be a function of quality of service (QoS).

After receiving the indication of future/current/past network slices, the network may respond to the UE. The response from the network entity may be an allowance, a rejection, an acknowledgement (ACK), or a negative ACK (NACK). Further, the indication of future/current/past network slices may correspond to a list associated with network slice selection assistance information (NSSAI), such as updated requested NSSAI or Wishlist NSSAI. As such, the response from the network entity may be an acknowledgement to Wishlist NSSAI. The list for NSSAI may be a separate list other than configured NSSAI. For instance, the new list may be referred to as granted NSSAI. Also, the granted NSSAI may be a subset or a superset of the Wishlist NSSAI.

The network entity (e.g., AMF) may send granted NSSAI and/or Wishlist NSSAI to the network node (e.g., a serving base station or serving gNB). Additionally, the list may be updated per UE-triggered signaling or per network decision.

In some instances, the network node (e.g., base station) may keep this list in the UE context including an RRC inactive state. Further, the network node (e.g., base station) may send NSSAI, e.g., granted NSSAI and/or Wishlist NSSAI, to another network node (e.g., base station or gNB). The network node (e.g., base station) may send the NSSAI, e.g., granted NSSAI and/or Wishlist NSSAI, during a handover procedure. Also, the network node (e.g., base station) may send the NSSAI, e.g., granted NSSAI and/or Wishlist NSSAI, during a context fetch for a resume or re-establishment procedure.

Additionally, the UE may transmit, to the network node (e.g., base station), a message or RRC message. The RRC message may be UE assistance information (UAI), an RRC complete message, or a new RRC message. For instance, the message transmitted to the network node (e.g., base station) may include the access probability of rejected network slices. The message transmitted to the network node (e.g., base station) may also include the list of network slices the UE may use in near future, e.g., with probability or without probability. Also, the message transmitted to the network node (e.g., base station) may include the history of past network slices, as discussed above.

The network entity (e.g., AMF) or network node (e.g., base station) may use the information received from the UE to make radio resource management (RRM) decisions. For instance, the network node (e.g., base station) may make a number of decisions, such as mobility, offloading, serving cell change, or addition decisions. Also, the network entity (e.g., AMF) may decide on or determine a particular radio access technology (RAT)/frequency selection priority (RFSP) index.

Aspects of the present disclosure may also include network entity or AMF-centric solutions. For instance, a network entity or AMF may collect network slice information and/or usage statistics from another network entity or session management function (SMF). The network entity or AMF may send such information to one or more network nodes (e.g., base stations). Further, the network entity or AMF may send such information to a network data analytics function (NWDAF). In some instances, the NWDAF may provide the expected usage probability of network slices to the serving AMF. In turn, the AMF may send the expected usage probability of network slices to a radio access network (RAN).

Figure 7:
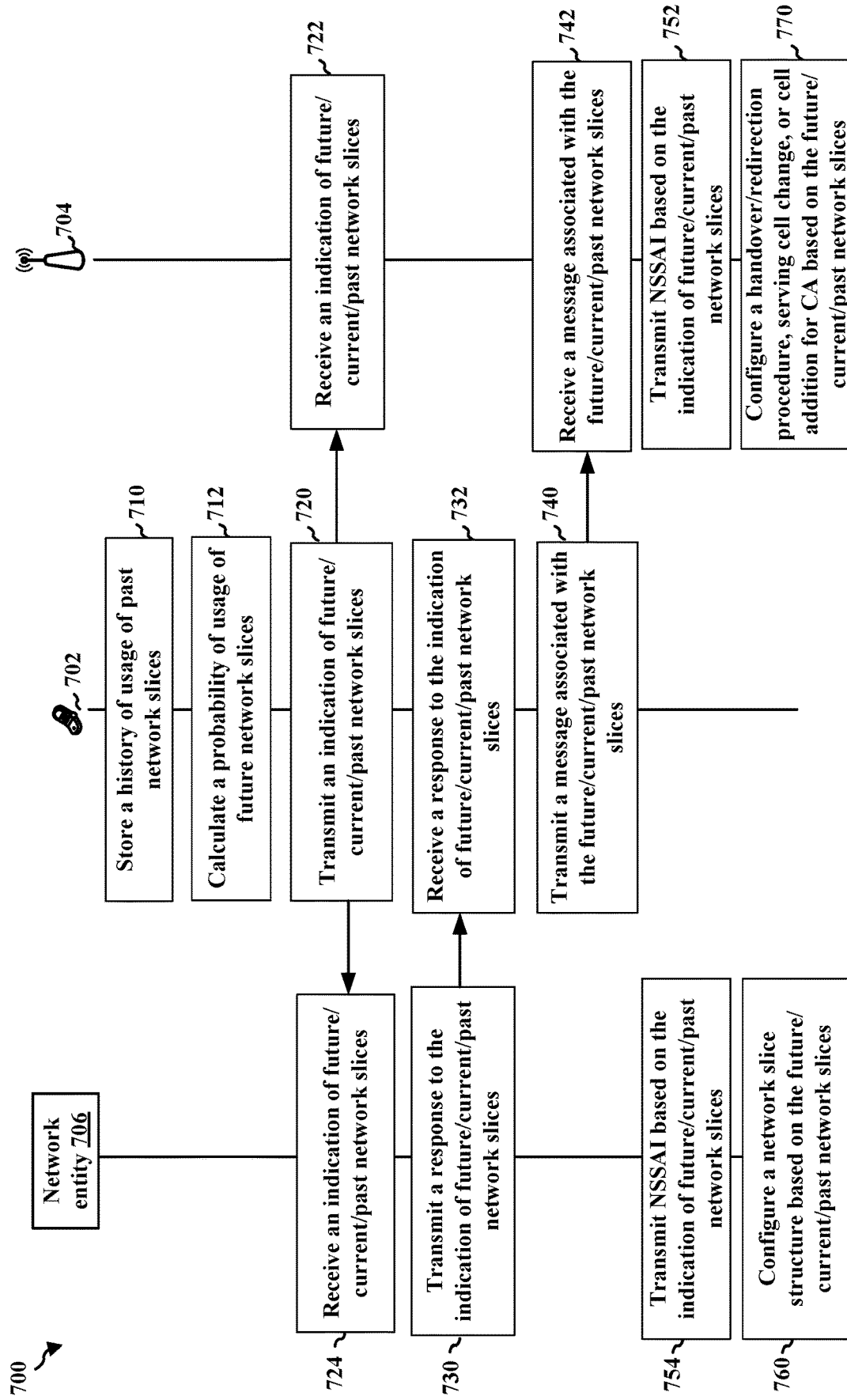
FIG. 7 is a diagram illustrating example communication between a UE, a network node (e.g., a base station), and a network entity (e.g., an access and mobility management function (AMF)).

FIG. 7 is a diagram 700 illustrating example communication between a UE 702, a network node 704 (e.g., base station), and a network entity 706 (e.g., an AMF).

At 710, UE 702 may store a history of usage of one or more past network slices prior to transmitting an indication of one or more past network slices.

At 712, UE 702 may calculate a probability of usage of one or more future network slices prior to transmitting an indication of one or more future network slices.

At 720, UE 702 may transmit, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Additionally, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority. The network entity may be an access and mobility management function (AMF), a session management function (SMF), or a network data analytics function (NWDAF).

At 722, network node 704 (e.g., a base station) may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE.

At 724, network entity 706 (e.g., AMF) may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE.

At 730, network entity 706 may transmit, to the at least one UE, a response to at least one of the indication of the one or more future network slices, the indication of the one or more current network slices, or the indication of the one or more past network slices.

At 732, UE 702 may receive, from the network entity, a response to at least one of the indication of the one or more future network slices, the indication of the one or more current network slices, or the indication of the one or more past network slices. The response may be an allowance, a rejection, an acknowledgement (ACK), or a negative ACK (NACK).

At 740, UE 702 may transmit, to the network node (e.g., base station) based on the response, a message associated with at least one of the one or more future network slices, the one or more current network slices, or the one or more past network slices. The message may be a radio resource control (RRC) message or a non-access stratum (NAS) message.

The RRC message may be a UE assistance information (UAI) message, an RRC complete message, or a new RRC message.

At 742, network node 704 may receive, from the at least one UE, a message associated with at least one of the one or more future network slices, the one or more current network slices, or the one or more past network slices.

At 752, network node 704 may transmit, to at least one other network node (e.g., base station), network slice selection assistance information (NSSAI) based on at least one of the indication of the one or more future network slices, the indication of the one or more current network slices, or the indication of the one or more past network slices.

At 754, network entity 706 may transmit, to at least one network node (e.g., base station), network slice selection assistance information (NSSAI) based on at least one of the indication of the one or more future network slices, the indication of the one or more current network slices, or the indication of the one or more past network slices.

At 760, network entity 706 may configure a network slice structure based on at least one of the one or more future network slices, the one or more current network slices, or the one or more past network slices.

At 770, network node 704 may configure at least one of a handover procedure, a redirection procedure, a serving cell change, or a cell addition for carrier aggregation (CA), the configuration being based on at least one of the one or more future network slices, the one or more current network slices, or the one or more past network slices.

Figure 8:
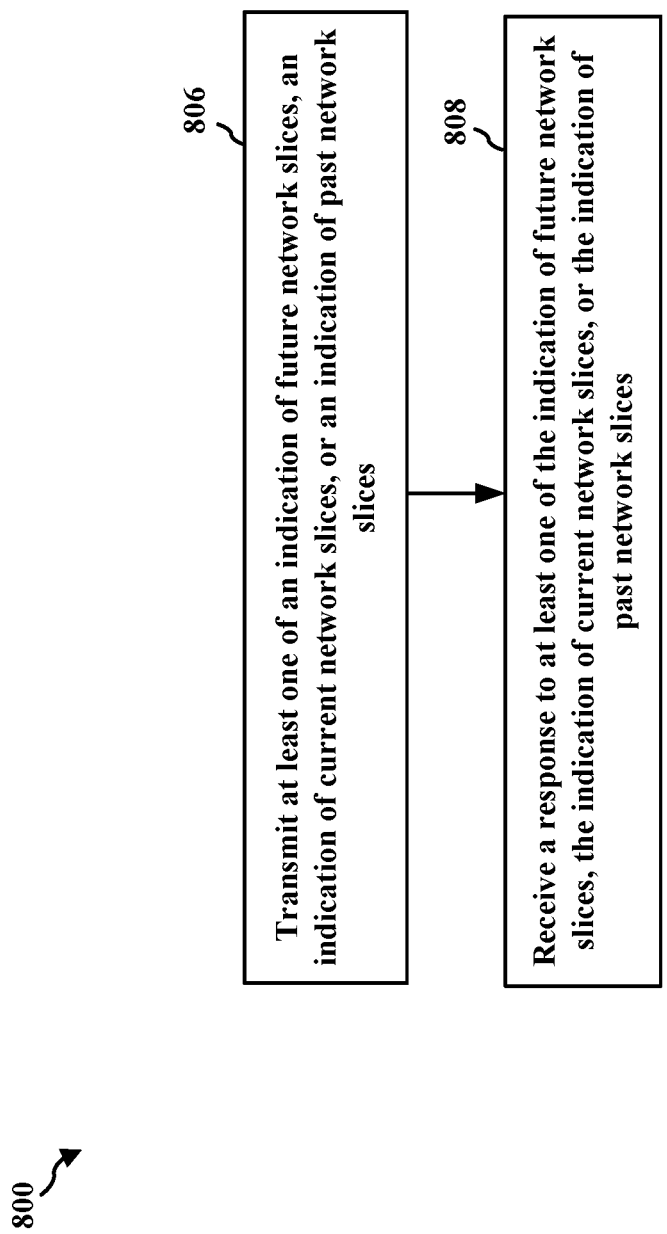
FIG. 8 is a flowchart of a method of wireless communication.

FIG. 8 is a flowchart 800 of a method of wireless communication. The method may be performed by a UE or a component of a UE (e.g., the UE 104, 350, 502, 602, 702; the apparatus 1402). The methods described herein may provide a number of benefits, such as improving communication signaling, resource utilization, and/or power savings.

At 806, the UE may transmit, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE, as described in connection with the examples in FIGS. 4-7. For example, UE 702 may transmit, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE, as described in connection with 720 in FIG. 7. Further, 806 may be performed by determination component 1440 in FIG. 14.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Additionally, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority. The network entity may be an access and mobility management function (AMF), a session management function (SMF), or a network data analytics function (NWDAF).

At 808, the UE may receive, from the network entity, a response to at least one of the indication of the one or more future network slices, the indication of the one or more current network slices, or the indication of the one or more past network slices, as described in connection with the examples in FIGS. 4-7. For example, UE 702 may receive, from the network entity, a response to at least one of the indication of the one or more future network slices, the indication of the one or more current network slices, or the indication of the one or more past network slices, as described in connection with 732 in FIG. 7. Further, 808 may be performed by determination component 1440 in FIG. 14. The response may be an allowance, a rejection, an acknowledgement (ACK), or a negative ACK (NACK).

Figure 9:
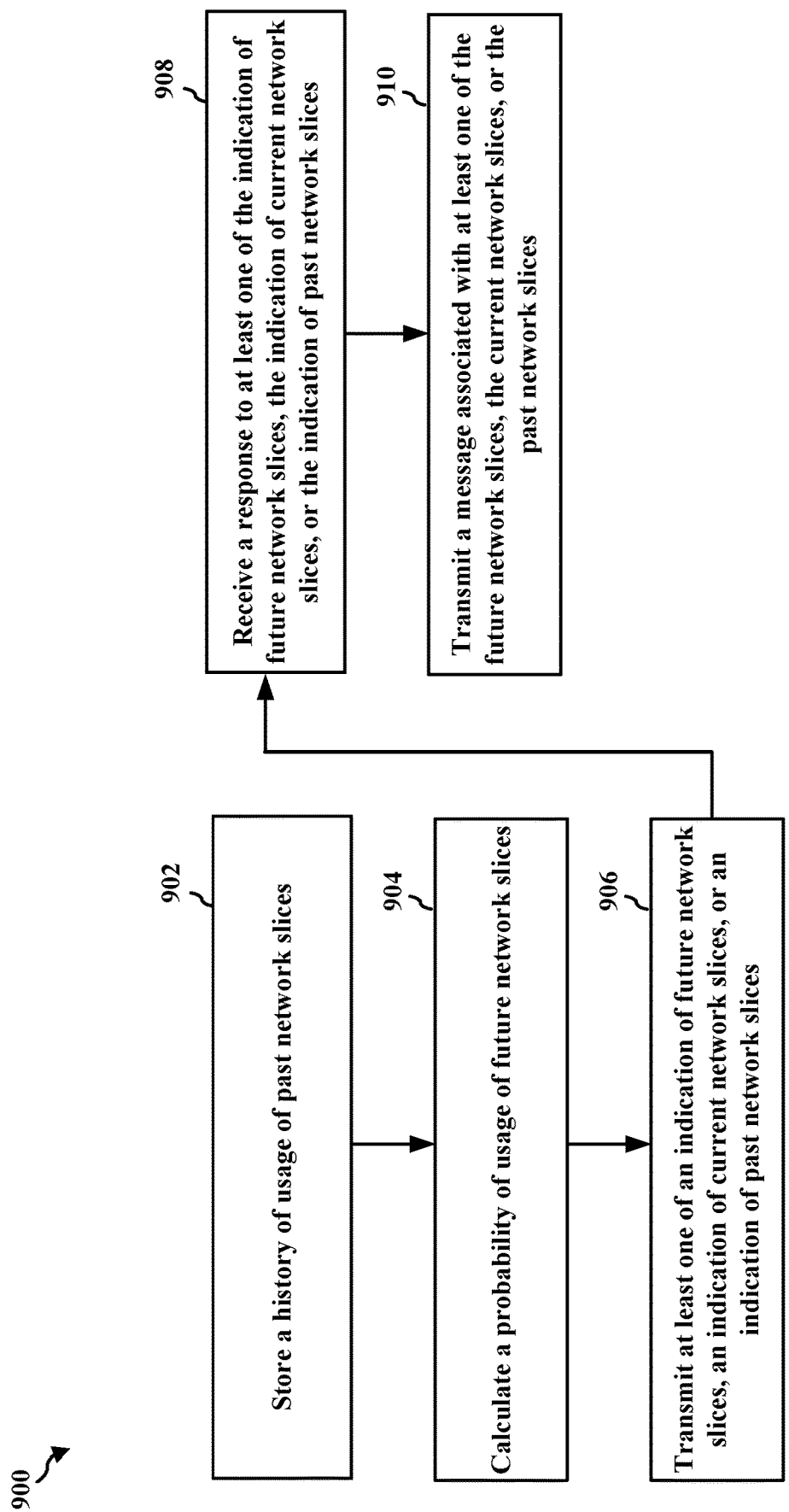
FIG. 9 is a flowchart of a method of wireless communication.

FIG. 9 is a flowchart 900 of a method of wireless communication. The method may be performed by a UE or a component of a UE (e.g., the UE 104, 350, 502, 602, 702; the apparatus 1402). The methods described herein may provide a number of benefits, such as improving communication signaling, resource utilization, and/or power savings.

At 902, the UE may store a history of usage of one or more past network slices prior to transmitting an indication of one or more past network slices, as described in connection with the examples in FIGS. 4-7. For example, UE 702 may store a history of usage of one or more past network slices prior to transmitting an indication of one or more past network slices, as described in connection with 710 in FIG. 7. Further, 902 may be performed by determination component 1440 in FIG. 14.

At 904, the UE may calculate a probability of usage of one or more future network slices prior to transmitting an indication of one or more future network slices, as described in connection with the examples in FIGS. 4-7. For example, UE 702 may calculate a probability of usage of one or more future network slices prior to transmitting an indication of one or more future network slices, as described in connection with 712 in FIG. 7. Further, 904 may be performed by determination component 1440 in FIG. 14.

At 906, the UE may transmit, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE, as described in connection with the examples in FIGS. 4-7. For example, UE 702 may transmit, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE, as described in connection with 720 in FIG. 7. Further, 906 may be performed by determination component 1440 in FIG. 14.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Additionally, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority. The network entity may be an access and mobility management function (AMF), a session management function (SMF), or a network data analytics function (NWDAF).

At 908, the UE may receive, from the network entity, a response to at least one of the indication of the one or more future network slices, the indication of the one or more current network slices, or the indication of the one or more past network slices, as described in connection with the examples in FIGS. 4-7. For example, UE 702 may receive, from the network entity, a response to at least one of the indication of the one or more future network slices, the indication of the one or more current network slices, or the indication of the one or more past network slices, as described in connection with 732 in FIG. 7. Further, 908 may be performed by determination component 1440 in FIG. 14. The response may be an allowance, a rejection, an acknowledgement (ACK), or a negative ACK (NACK).

At 910, the UE may transmit, to the network node (e.g., base station) based on the response, a message associated with at least one of the one or more future network slices, the one or more current network slices, or the one or more past network slices, as described in connection with the examples in FIGS. 4-7. For example, UE 702 may transmit, to the network node (e.g., base station) based on the response, a message associated with at least one of the one or more future network slices, the one or more current network slices, or the one or more past network slices, as described in connection with 740 in FIG. 7. Further, 910 may be performed by determination component 1440 in FIG. 14. The message may be a radio resource control (RRC) message or a non-access stratum (NAS) message. The RRC message may be a UE assistance information (UAI) message, an RRC complete message, or a new RRC message.

Figure 10:
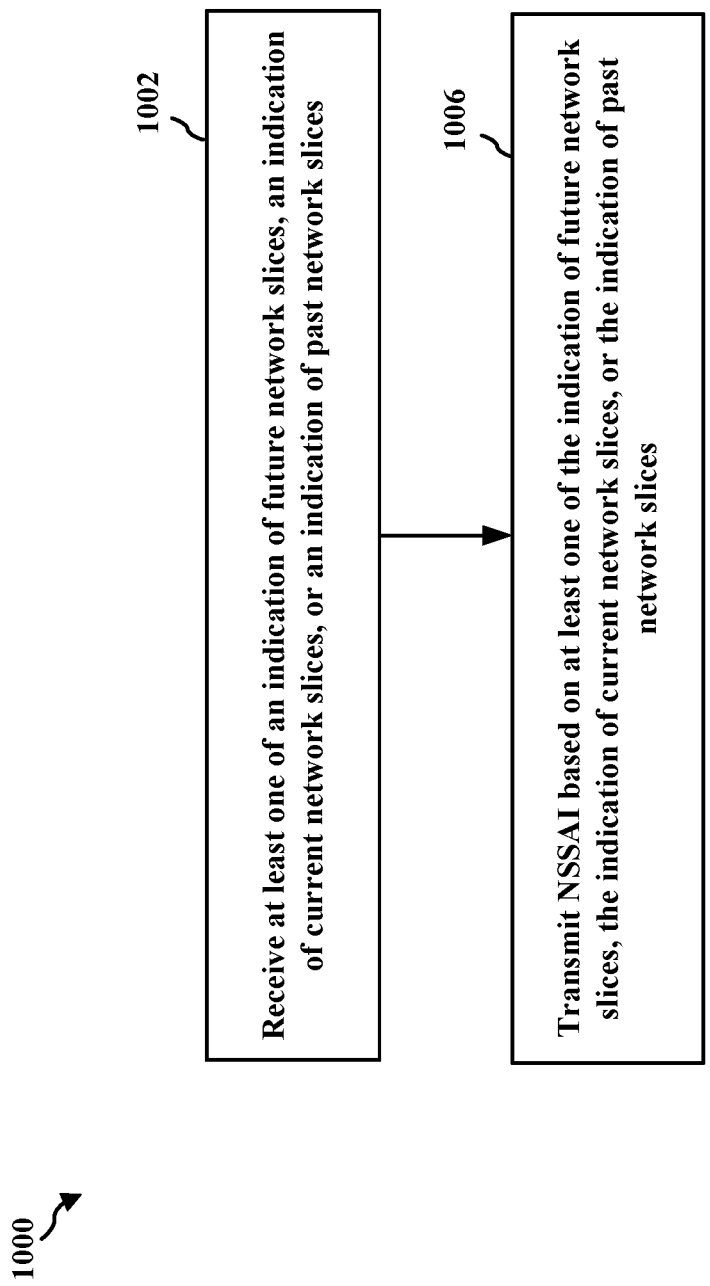
FIG. 10 is a flowchart of a method of wireless communication.

FIG. 10 is a flowchart 1000 of a method of wireless communication. The method may be performed by a network entity or a component of a network entity (e.g., the AMF 192, 606; network entity 706; the apparatus 1502). The methods described herein may provide a number of benefits, such as improving communication signaling, resource utilization, and/or power savings.

At 1002, the network entity may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with the examples in FIGS. 4-7. For example, network entity 706 may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with 724 in FIG. 7. Further, 1002 may be performed by determination component 1540 in FIG. 15.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Moreover, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority. The network entity may be an access and mobility management function (AMF), a session management function (SMF), or a network data analytics function (NWDAF). In some aspects, if the network entity is an AMF, the network entity may receive, from the SMF, network slice information associated with at least one of the one or more future network slices, the one or more current network slices, or the one or more past network slices; and transmit, to the NWDAF, an indication of the received network slice information.

At 1006, the network entity may transmit, to at least one network node (e.g., base station), network slice selection assistance information (NSSAI) based on at least one of the indication of the one or more future network slices, the indication of the one or more current network slices, or the indication of the one or more past network slices, as described in connection with the examples in FIGS. 4-7. For example, network entity 706 may transmit, to at least one network node (e.g., base station), network slice selection assistance information (NSSAI) based on at least one of the indication of the one or more future network slices, the indication of the one or more current network slices, or the indication of the one or more past network slices, as described in connection with 754 in FIG. 7. Further, 1006 may be performed by determination component 1540 in FIG. 15.

Figure 11:
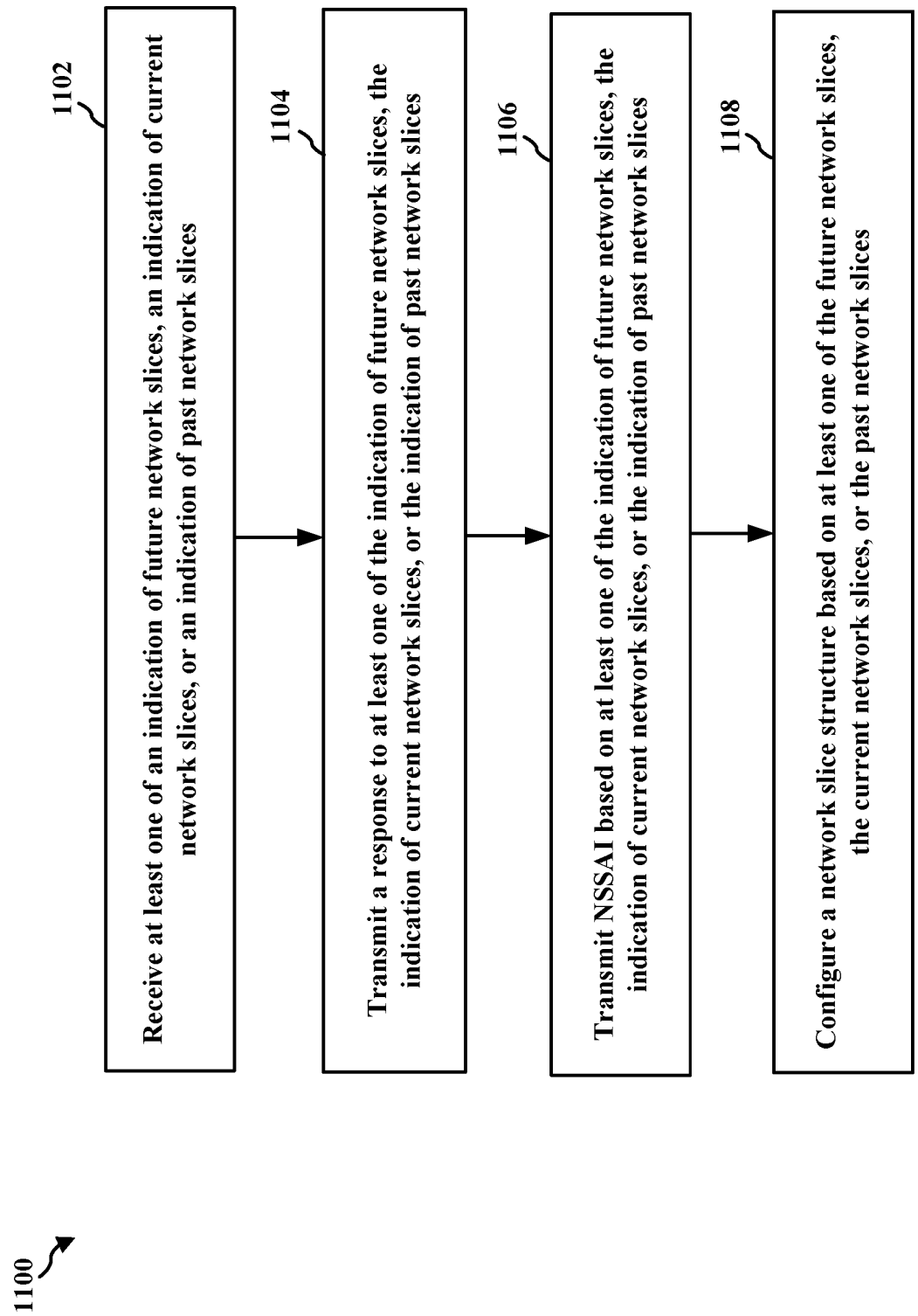
FIG. 11 is a flowchart of a method of wireless communication.

FIG. 11 is a flowchart 1100 of a method of wireless communication. The method may be performed by a network entity or a component of a network entity (e.g., the AMF 192, 606; network entity 706; the apparatus 1502). The methods described herein may provide a number of benefits, such as improving communication signaling, resource utilization, and/or power savings.

At 1102, the network entity may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with the examples in FIGS. 4-7. For example, network entity 706 may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with 724 in FIG. 7. Further, 1102 may be performed by determination component 1540 in FIG. 15.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Moreover, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority. The network entity may be an access and mobility management function (AMF), a session management function (SMF), or a network data analytics function (NWDAF). In some aspects, if the network entity is an AMF, the network entity may receive, from the SMF, network slice information associated with at least one of the one or more future network slices, the one or more current network slices, or the one or more past network slices; and transmit, to the NWDAF, an indication of the received network slice information.

At 1104, the network entity may transmit, to the at least one UE, a response to at least one of the indication of the one or more future network slices, the indication of the one or more current network slices, or the indication of the one or more past network slices, as described in connection with the examples in FIGS. 4-7. For example, network entity 706 may transmit, to the at least one UE, a response to at least one of the indication of the one or more future network slices, the indication of the one or more current network slices, or the indication of the one or more past network slices, as described in connection with 730 in FIG. 7. Further, 1104 may be performed by determination component 1540 in FIG. 15. The response may be an allowance, a rejection, an acknowledgement (ACK), or a negative ACK (NACK).

At 1106, the network entity may transmit, to at least one network node (e.g., base station), network slice selection assistance information (NSSAI) based on at least one of the indication of the one or more future network slices, the indication of the one or more current network slices, or the indication of the one or more past network slices, as described in connection with the examples in FIGS. 4-7. For example, network entity 706 may transmit, to at least one network node (e.g., base station), network slice selection assistance information (NSSAI) based on at least one of the indication of the one or more future network slices, the indication of the one or more current network slices, or the indication of the one or more past network slices, as described in connection with 754 in FIG. 7. Further, 1106 may be performed by determination component 1540 in FIG. 15.

At 1108, the network entity may configure a network slice structure based on at least one of the one or more future network slices, the one or more current network slices, or the one or more past network slices, as described in connection with the examples in FIGS. 4-7. For example, network entity 706 may configure a network slice structure based on at least one of the one or more future network slices, the one or more current network slices, or the one or more past network slices, as described in connection with 760 in FIG. 7. Further, 1108 may be performed by determination component 1540 in FIG. 15. The network slice structure may be associated with a radio resource management (RRM) decision at the network entity. The RRM decision may be associated with a decision to handover or redirect to at least one other network node (e.g., base station), at least one other frequency, or at least one other radio access technology (RAT).

Figure 12:
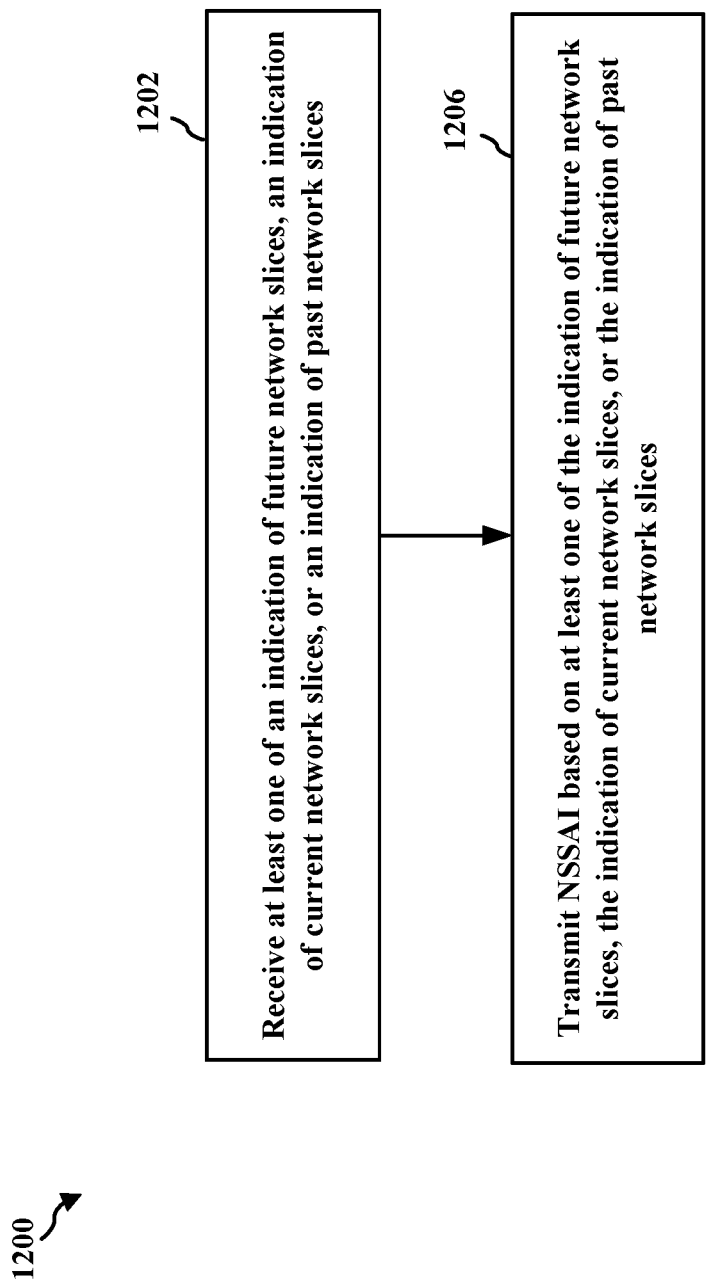
FIG. 12 is a flowchart of a method of wireless communication.

FIG. 12 is a flowchart 1200 of a method of wireless communication. The method may be performed by a network node (e.g., base station) or a component of a network node (e.g., the base station 102, 180, 310, 604; network node 704; the apparatus 1602). The methods described herein may provide a number of benefits, such as improving communication signaling, resource utilization, and/or power savings.

At 1202, the network node (e.g., base station) may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with the examples in FIGS. 4-7. For example, network node 704 may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with 722 in FIG. 7. Further, 1202 may be performed by determination component 1640 in FIG. 16.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Additionally, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority.

At 1206, the network node (e.g., base station) may transmit, to at least one other network node (e.g., base station), network slice selection assistance information (NSSAI) based on at least one of the indication of the one or more future network slices, the indication of the one or more current network slices, or the indication of the one or more past network slices, as described in connection with the examples in FIGS. 4-7. For example, network node 704 may transmit, to at least one other network node (e.g., base station), network slice selection assistance information (NSSAI) based on at least one of the indication of the one or more future network slices, the indication of the one or more current network slices, or the indication of the one or more past network slices, as described in connection with 752 in FIG. 7. Further, 1206 may be performed by determination component 1640 in FIG. 16.

Figure 13:
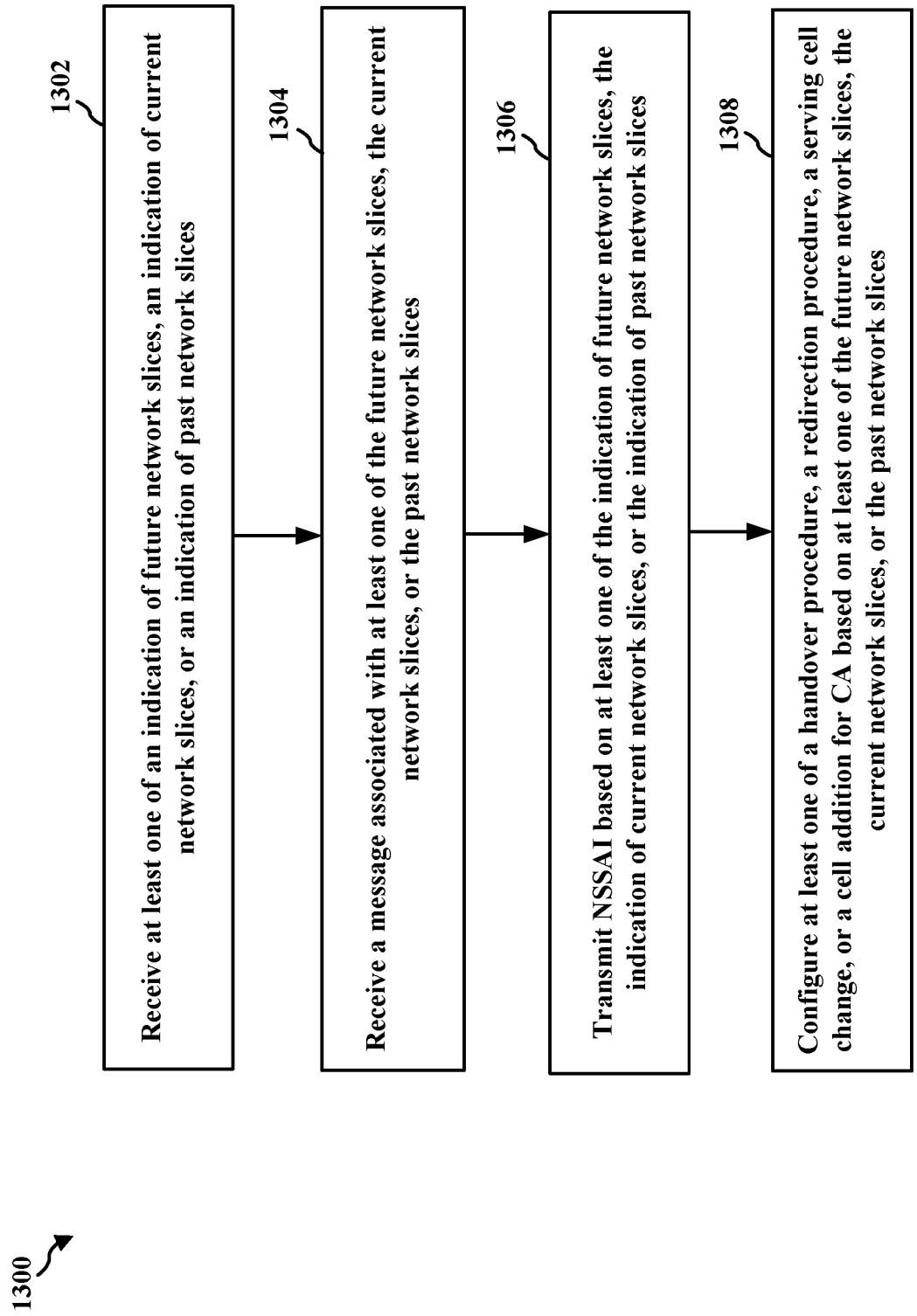
FIG. 13 is a flowchart of a method of wireless communication.

FIG. 13 is a flowchart 1300 of a method of wireless communication. The method may be performed by a network node (e.g., base station) or a component of a network node (e.g., the base station 102, 180, 310, 604; network node 704; the apparatus 1602). The methods described herein may provide a number of benefits, such as improving communication signaling, resource utilization, and/or power savings.

At 1302, the network node (e.g., base station) may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with the examples in FIGS. 4-7. For example, network node 704 may receive, from at least one UE, at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, as described in connection with 722 in FIG. 7. Further, 1302 may be performed by determination component 1640 in FIG. 16.

In some aspects, the indication of the one or more future network slices may include at least one of: a probability of usage of the one or more future network slices, a weight factor for the one or more future network slices, or a priority index for the one or more future network slices. The indication of the one or more current network slices may include at least one of: a weight factor for the one or more current network slices or a priority index for the one or more current network slices. The indication of the one or more past network slices may include a history of usage of the one or more past network slices. The history of usage of the one or more past network slices may include at least one of: an amount of previous usage of the one or more past network slices in a duration, a weight factor for the one or more past network slices, or a priority index for the one or more past network slices.

Additionally, the indication of the one or more future network slices may correspond to a list associated with network slice selection assistance information (NSSAI). The list associated with the NSSAI may correspond to updated requested NSSAI or a wish list for NSSAI. The list associated with the NSSAI may correspond to an expansion of requested NSSAI or an adjustment of requested NSSAI. The one or more future network slices may be associated with a slice priority, the one or more current network slices may be associated with the slice priority, and the one or more past network slices may be associated with the slice priority.

At 1304, the network node (e.g., base station) may receive, from the at least one UE, a message associated with at least one of the one or more future network slices, the one or more current network slices, or the one or more past network slices, as described in connection with the examples in FIGS. 4-7. For example, network node 704 may receive, from the at least one UE, a message associated with at least one of the one or more future network slices, the one or more current network slices, or the one or more past network slices, as described in connection with 742 in FIG. 7. Further, 1304 may be performed by determination component 1640 in FIG. 16. The message may be a radio resource control (RRC) message or a non-access stratum (NAS) message. The RRC message may be a UE assistance information (UAI) message, an RRC complete message, or a new RRC message.

At 1306, the network node (e.g., base station) may transmit, to at least one other network node (e.g., base station), network slice selection assistance information (NS-SAI) based on at least one of the indication of the one or more future network slices, the indication of the one or more current network slices, or the indication of the one or more past network slices, as described in connection with the examples in FIGS. 4-7. For example, network node 704 may transmit, to at least one other network node (e.g., base station), network slice selection assistance information (NS-SAI) based on at least one of the indication of the one or more future network slices, the indication of the one or more current network slices, or the indication of the one or more past network slices, as described in connection with 752 in FIG. 7. Further, 1306 may be performed by determination component 1640 in FIG. 16.

At 1308, the network node (e.g., base station) may configure at least one of a handover procedure, a redirection procedure, a serving cell change, or a cell addition for carrier aggregation (CA), the configuration being based on at least one of the one or more future network slices, the one or more current network slices, or the one or more past network slices, as described in connection with the examples in FIGS. 4-7. For example, network node 704 may configure at least one of a handover procedure, a redirection procedure, a serving cell change, or a cell addition for carrier aggregation (CA), the configuration being based on at least one of the one or more future network slices, the one or more current network slices, or the one or more past network slices, as described in connection with 770 in FIG. 7. Further, 1308 may be performed by determination component 1640 in FIG. 16. The handover procedure or the redirection procedure may be associated with a handover or a redirection to the at least one other network node (e.g., base station), at least one other frequency, or at least one other radio access technology (RAT).

Figure 14:
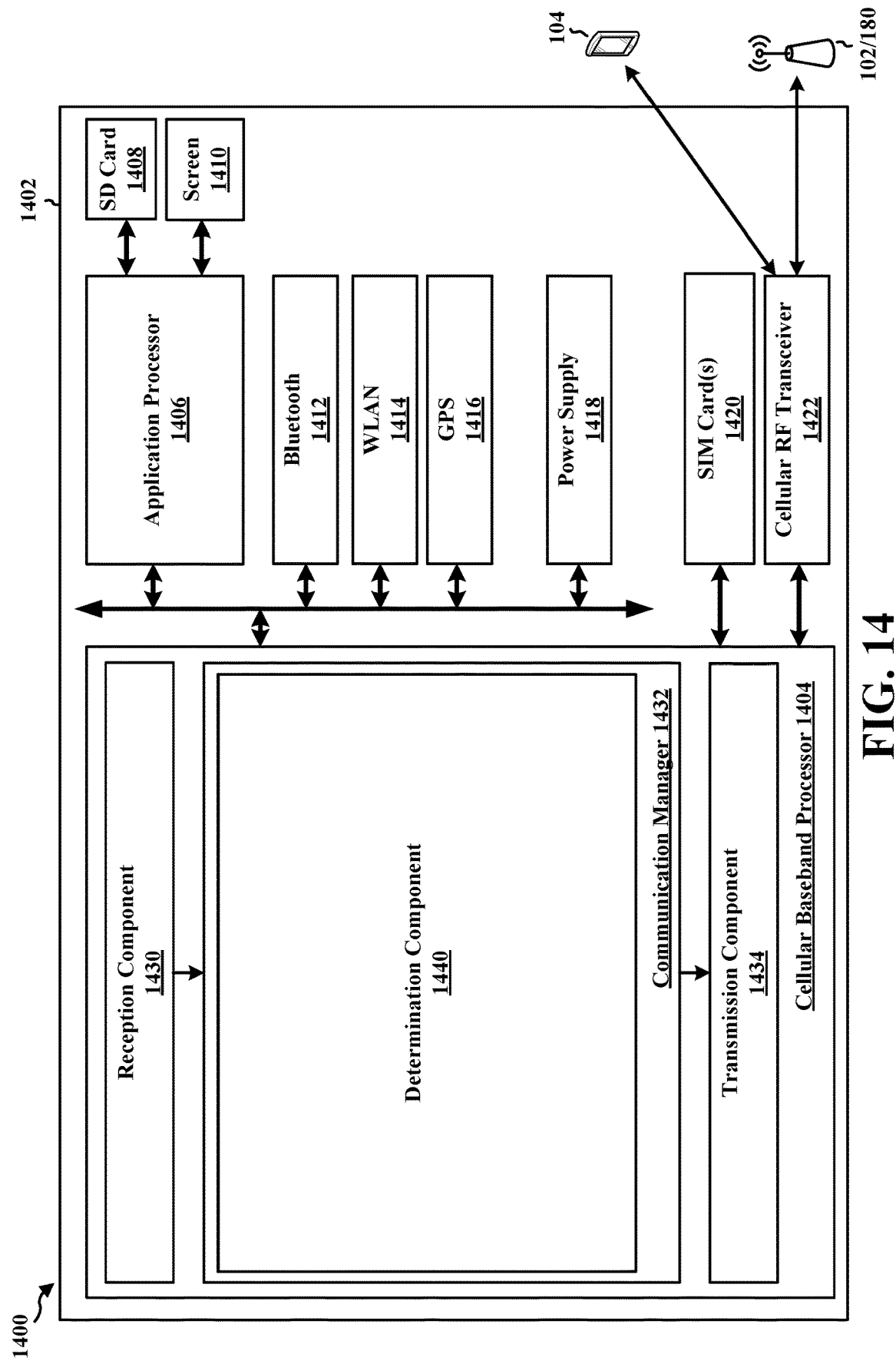
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a determination component 1440 that is configured to store a history of usage of one or more past network slices prior to transmitting an indication of one or more past network slices, e.g., as described in connection with step 902 above. Determination component 1440 may also be configured to calculate a probability of usage of one or more future network slices prior to transmitting an indication of one or more future network slices, e.g., as described in connection with step 904 above. Determination component 1440 may also be configured to transmit, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE, e.g., as described in connection with step 906 above. Determination component 1440 may also be configured to receive, from the network entity, a response to at least one of the indication of the one or more future network slices, the indication of the one or more current network slices, or the indication of the one or more past network slices, e.g., as described in connection with step 908 above. Determination component 1440 may also be configured to transmit, to the network node (e.g., base station) based on the response, a message associated with at least one of the one or more future network slices, the one or more current network slices, or the one or more past network slices, e.g., as described in connection with step 910 above.

The apparatus may include additional components that perform each of the blocks of the algorithm in the flowcharts of FIGS. 7-9. As such, each block in the flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for storing a history of usage of one or more past network slices prior to transmitting an indication of one or more past network slices. The apparatus 1402 may also include means for calculating a probability of usage of one or more future network slices prior to transmitting an indication of one or more future network slices. The apparatus 1402 may also include means for transmitting, to at least one of a network node (e.g., base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE. The apparatus 1402 may also include means for receiving, from the network entity, a response to at least one of the indication of the one or more future network slices, the indication of the one or more current network slices, or the indication of the one or more past network slices. The apparatus 1402 may also include means for transmitting, to the network node (e.g., base station) based on the response, a message associated with at least one of the one or more future network slices, the one or more current network slices, or the one or more past network slices. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
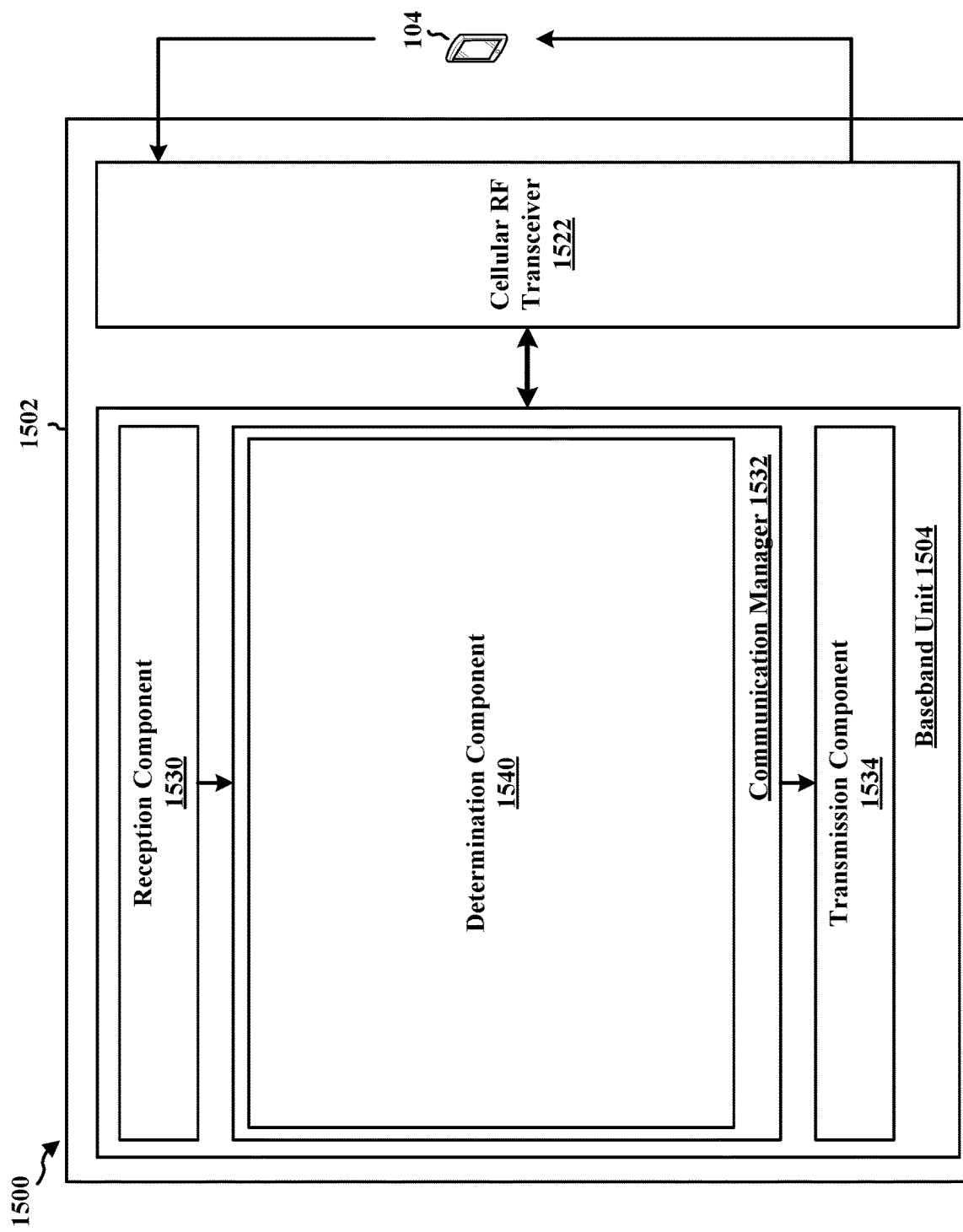
FIG. 15 is a diagram illustrating an example of a hardware implementation for an example apparatus.

FIG. 15 is a diagram 1500 illustrating an example of a hardware implementation for an apparatus 1502. The apparatus 1502 may be a network entity, a component of a network entity, or may implement network entity functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the AMF 192.

The communication manager 1532 includes a determination component 1540 that is configured to receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, e.g., as described in connection with step 1102 above. Determination component 1540 may also be configured to transmit, to the at least one UE, a response to at least one of the indication of the one or more future network slices, the indication of the one or more current network slices, or the indication of the one or more past network slices, e.g., as described in connection with step 1104 above. Determination component 1540 may also be configured to transmit, to at least one network node (e.g., base station), network slice selection assistance information (NSSAI) based on at least one of the indication of the one or more future network slices, the indication of the one or more current network slices, or the indication of the one or more past network slices, e.g., as described in connection with step 1106 above. Determination component 1540 may also be configured to configure a network slice structure based on at least one of the one or more future network slices, the one or more current network slices, or the one or more past network slices, e.g., as described in connection with step 1108 above.

The apparatus may include additional components that perform each of the blocks of the algorithm in the flowcharts of FIGS. 7, 10, and 11. As such, each block in the flowcharts of FIGS. 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE. The apparatus 1502 may also include means for transmitting, to the at least one UE, a response to at least one of the indication of the one or more future network slices, the indication of the one or more current network slices, or the indication of the one or more past network slices. The apparatus 1502 may also include means for transmitting, to at least one network node (e.g., base station), network slice selection assistance information (NSSAI) based on at least one of the indication of the one or more future network slices, the indication of the one or more current network slices, or the indication of the one or more past network slices. The apparatus 1502 may also include means for configuring a network slice structure based on at least one of the one or more future network slices, the one or more current network slices, or the one or more past network slices. The means may be one or more of the components of the apparatus 1502 configured to perform the functions recited by the means. As described supra, the apparatus 1502 may include the AMF 192. As such, in one configuration, the means may be the AMF 192 configured to perform the functions recited by the means.

Figure 16:
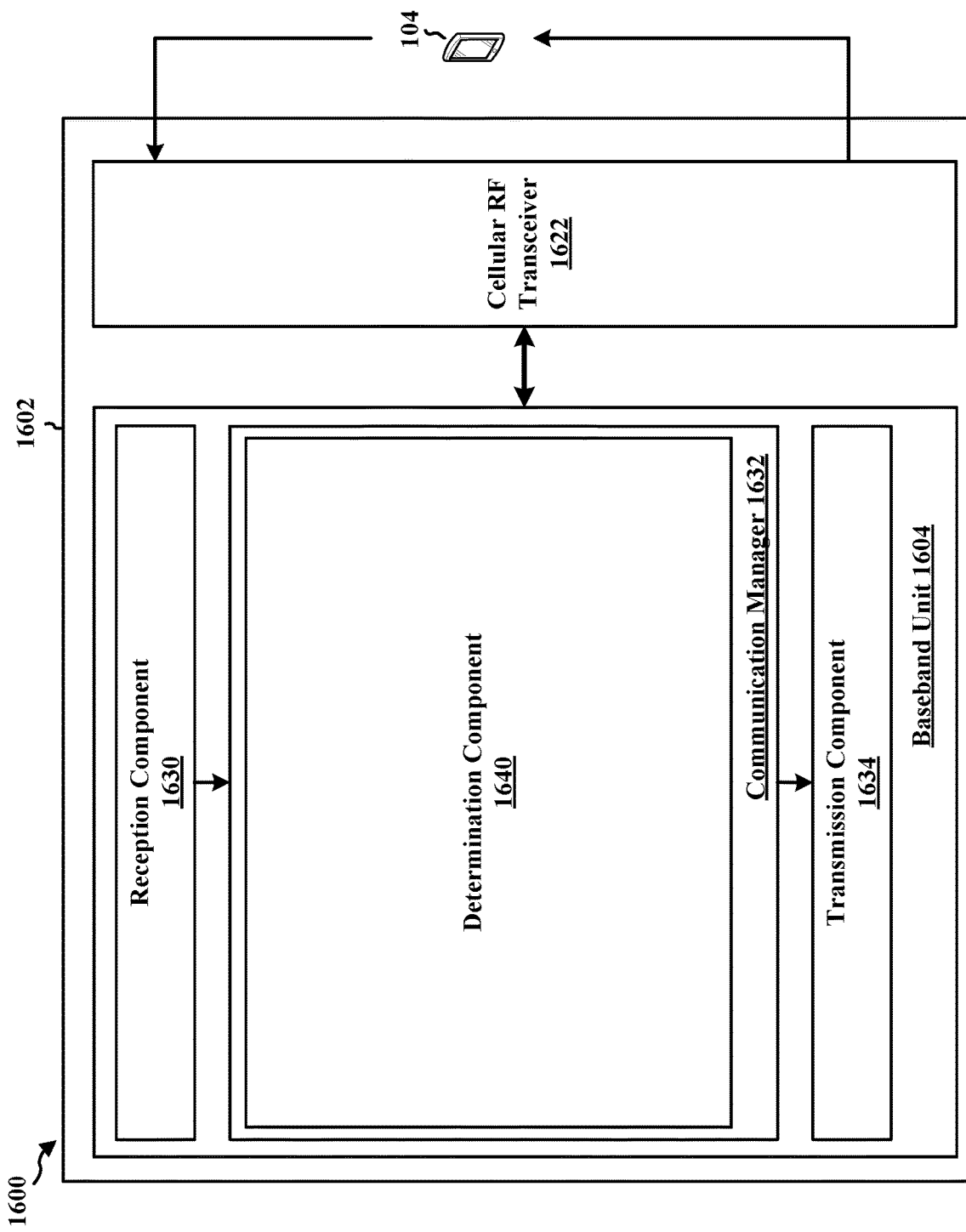
FIG. 16 is a diagram illustrating an example of a hardware implementation for an example apparatus.

FIG. 16 is a diagram 1600 illustrating an example of a hardware implementation for an apparatus 1602. The apparatus 1602 may be a network node (e.g., base station), a component of a network node (e.g., base station), or may implement network node or base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a determination component 1640 that is configured to receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE, e.g., as described in connection with step 1302 above. Determination component 1640 may also be configured to receive, from the at least one UE, a message associated with at least one of the one or more future network slices, the one or more current network slices, or the one or more past network slices, e.g., as described in connection with step 1304 above. Determination component 1640 may also be configured to transmit, to at least one other network node (e.g., base station), network slice selection assistance information (NSSAI) based on at least one of the indication of the one or more future network slices, the indication of the one or more current network slices, or the indication of the one or more past network slices, e.g., as described in connection with step 1306 above. Determination component 1640 may also be configured to configure at least one of a handover procedure, a redirection procedure, a serving cell change, or a cell addition for carrier aggregation (CA), the configuration being based on at least one of the one or more future network slices, the one or more current network slices, or the one or more past network slices, e.g., as described in connection with step 1308 above.

The apparatus may include additional components that perform each of the blocks of the algorithm in the flowcharts of FIGS. 7, 12, and 13. As such, each block in the flowcharts of FIGS. 7, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE. The apparatus 1602 may also include means for receiving, from the at least one UE, a message associated with at least one of the one or more future network slices, the one or more current network slices, or the one or more past network slices. The apparatus 1602 may also include means for transmitting, to at least one other network node (e.g., base station), network slice selection assistance information (NSSAI) based on at least one of the indication of the one or more future network slices, the indication of the one or more current network slices, or the indication of the one or more past network slices. The apparatus 1602 may also include means for configuring at least one of a handover procedure, a redirection procedure, a serving cell change, or a cell addition for carrier aggregation (CA), the configuration being based on at least one of the one or more future network slices, the one or more current network slices, or the one or more past network slices. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a user equipment (UE) including at least one processor coupled to a memory and, based at least in part on information stored in the memory, the at least one processor is configured to: transmit, to at least one of a network node (e.g., a base station) or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE; and receive, from the network entity, a response to at least one of the indication of the one or more future network slices, the indication of the one or more current network slices, or the indication of the one or more past network slices.

Aspect 2 is the apparatus of aspect 1, where the indication of the one or more future network slices includes at least one of: a probability of usage of the one or more future network slices, a weight factor for the one or more future network slices, or a priority index for the one or more future network slices.

Aspect 3 is the apparatus of any of aspects 1 and 2, where the indication of the one or more current network slices includes at least one of: a weight factor for the one or more current network slices or a priority index for the one or more current network slices.

Aspect 4 is the apparatus of any of aspects 1 to 3, where the indication of the one or more past network slices includes a history of usage of the one or more past network slices.

Aspect 5 is the apparatus of any of aspects 1 to 4, where the history of usage of the one or more past network slices includes at least one of: an amount of previous usage of the one or more past network slices in a duration, a weight factor for the one or more past network slices, or a priority index for the one or more past network slices.

Aspect 6 is the apparatus of any of aspects 1 to 5, where the indication of the one or more future network slices corresponds to a list associated with network slice selection assistance information (NSSAI).

Aspect 7 is the apparatus of any of aspects 1 to 6, where the list associated with the NSSAI corresponds to updated requested NSSAI or a wish list for NSSAI.

Aspect 8 is the apparatus of any of aspects 1 to 7, where the list associated with the NSSAI corresponds to an expansion of requested NSSAI or an adjustment of requested NSSAI.

Aspect 9 is the apparatus of any of aspects 1 to 8, where the at least one processor is further configured to: store a history of usage of the one or more past network slices prior to transmitting the indication of the one or more past network slices.

Aspect 10 is the apparatus of any of aspects 1 to 9, where the at least one processor is further configured to: calculate a probability of usage of the one or more future network slices prior to transmitting the indication of the one or more future network slices.

Aspect 11 is the apparatus of any of aspects 1 to 10, where the response is an allowance, a rejection, an acknowledgement (ACK), or a negative ACK (NACK).

Aspect 12 is the apparatus of any of aspects 1 to 11, where the at least one processor is further configured to: transmit, to the network node (e.g., a base station) based on the response, a message associated with at least one of the one or more future network slices, the one or more current network slices, or the one or more past network slices.

Aspect 13 is the apparatus of any of aspects 1 to 12, where the message is a radio resource control (RRC) message or a non-access stratum (NAS) message.

Aspect 14 is the apparatus of any of aspects 1 to 13, where the RRC message is a UE assistance information (UAI) message, an RRC complete message, or a new RRC message.

Aspect 15 is the apparatus of any of aspects 1 to 14, where the one or more future network slices are associated with a slice priority, the one or more current network slices are associated with the slice priority, and the one or more past network slices are associated with the slice priority.

Aspect 16 is the apparatus of any of aspects 1 to 15, further including a transceiver coupled to the at least one processor, where the network entity is an access and mobility management function (AMF), a session management function (SMF), or a network data analytics function (NWDAF).

Aspect 17 is an apparatus for wireless communication at a network entity including at least one processor coupled to a memory and, based at least in part on information stored in the memory, the at least one processor is configured to: receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE; and transmit, to at least one network node (e.g., a base station), network slice selection assistance information (NSSAI) based on at least one of the indication of the one or more future network slices, the indication of the one or more current network slices, or the indication of the one or more past network slices.

Aspect 18 is the apparatus of aspect 17, where the indication of the one or more future network slices includes at least one of: a probability of usage of the one or more future network slices, a weight factor for the one or more future network slices, or a priority index for the one or more future network slices.

Aspect 19 is the apparatus of any of aspects 17 and 18, where the indication of the one or more current network slices includes at least one of: a weight factor for the one or more current network slices or a priority index for the one or more current network slices.

Aspect 20 is the apparatus of any of aspects 17 to 19, where the indication of the one or more past network slices includes a history of usage of the one or more past network slices.

Aspect 21 is the apparatus of any of aspects 17 to 20, where the history of usage of the one or more past network slices includes at least one of: an amount of previous usage of the one or more past network slices in a duration, a weight factor for the one or more past network slices, or a priority index for the one or more past network slices.

Aspect 22 is the apparatus of any of aspects 17 to 21, where the indication of the one or more future network slices corresponds to a list associated with network slice selection assistance information (NSSAI).

Aspect 23 is the apparatus of any of aspects 17 to 22, where the list associated with the NSSAI corresponds to updated requested NSSAI or a wish list for NSSAI.

Aspect 24 is the apparatus of any of aspects 17 to 23, where the list associated with the NSSAI corresponds to an expansion of requested NSSAI or an adjustment of requested NSSAI.

Aspect 25 is the apparatus of any of aspects 17 to 24, where the at least one processor is further configured to: configure a network slice structure based on at least one of the one or more future network slices, the one or more current network slices, or the one or more past network slices.

Aspect 26 is the apparatus of any of aspects 17 to 25, where the network slice structure is associated with a radio resource management (RRM) decision at the network entity.

Aspect 27 is the apparatus of any of aspects 17 to 26, where the RRM decision is associated with a decision to handover or redirect to at least one other network node (e.g., a base station), at least one other frequency, or at least one other radio access technology (RAT).

Aspect 28 is the apparatus of any of aspects 17 to 27, where the at least one processor is further configured to: transmit, to the at least one UE, a response to at least one of the indication of the one or more future network slices, the indication of the one or more current network slices, or the indication of the one or more past network slices.

Aspect 29 is the apparatus of any of aspects 17 to 28, where the response is an allowance, a rejection, an acknowledgement (ACK), or a negative ACK (NACK).

Aspect 30 is the apparatus of any of aspects 17 to 29, where the one or more future network slices are associated with a slice priority, the one or more current network slices are associated with the slice priority, and the one or more past network slices are associated with the slice priority.

Aspect 31 is the apparatus of any of aspects 17 to 30, further including a transceiver coupled to the at least one processor, where the network entity is an access and mobility management function (AMF), a session management function (SMF), or a network data analytics function (NWDAF).

Aspect 32 is the apparatus of any of aspects 17 to 31, where the network entity is the AMF, where the at least one processor is further configured to: receive, from the SMF, network slice information associated with at least one of the one or more future network slices, the one or more current network slices, or the one or more past network slices; and transmit, to the NWDAF, an indication of the received network slice information.

Aspect 33 is an apparatus for wireless communication at a network node (e.g., a base station) including at least one processor coupled to a memory and, based at least in part on information stored in the memory, the at least one processor is configured to: receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE; and transmit, to at least one other network node (e.g., a base station), network slice selection assistance information (NSSAI) based on at least one of the indication of the one or more future network slices, the indication of the one or more current network slices, or the indication of the one or more past network slices.

Aspect 34 is the apparatus of aspect 33, where the indication of the one or more future network slices includes at least one of: a probability of usage of the one or more future network slices, a weight factor for the one or more future network slices, or a priority index for the one or more future network slices.

Aspect 35 is the apparatus of any of aspects 33 and 34, where the indication of the one or more current network slices includes at least one of: a weight factor for the one or more current network slices or a priority index for the one or more current network slices.

Aspect 36 is the apparatus of any of aspects 33 to 35, where the indication of the one or more past network slices includes a history of usage of the one or more past network slices.

Aspect 37 is the apparatus of any of aspects 33 to 36, where the history of usage of the one or more past network slices includes at least one of: an amount of previous usage of the one or more past network slices in a duration, a weight factor for the one or more past network slices, or a priority index for the one or more past network slices.

Aspect 38 is the apparatus of any of aspects 33 to 37, where the indication of the one or more future network slices corresponds to a list associated with network slice selection assistance information (NSSAI).

Aspect 39 is the apparatus of any of aspects 33 to 38, where the list associated with the NSSAI corresponds to updated requested NSSAI or a wish list for NSSAI.

Aspect 40 is the apparatus of any of aspects 33 to 39, where the list associated with the NSSAI corresponds to an expansion of requested NSSAI or an adjustment of requested NSSAI.

Aspect 41 is the apparatus of any of aspects 33 to 40, where the at least one processor is further configured to: configure at least one of a handover procedure, a redirection procedure, a serving cell change, or a cell addition for carrier aggregation (CA), the configuration being based on at least one of the one or more future network slices, the one or more current network slices, or the one or more past network slices.

Aspect 42 is the apparatus of any of aspects 33 to 41, where the handover procedure or the redirection procedure is associated with a handover or a redirection to the at least one other network node (e.g., a base station), at least one other frequency, or at least one other radio access technology (RAT).

Aspect 43 is the apparatus of any of aspects 33 to 42, where the at least one processor is further configured to: receive, from the at least one UE, a message associated with at least one of the one or more future network slices, the one or more current network slices, or the one or more past network slices.

Aspect 44 is the apparatus of any of aspects 33 to 43, where the message is a radio resource control (RRC) message or a non-access stratum (NAS) message.

Aspect 45 is the apparatus of any of aspects 33 to 44, where the RRC message is a UE assistance information (UAI) message, an RRC complete message, or a new RRC message.

Aspect 46 is the apparatus of any of aspects 33 to 45, further including a transceiver coupled to the at least one processor, where the one or more future network slices are associated with a slice priority, the one or more current network slices are associated with the slice priority, and the one or more past network slices are associated with the slice priority.

Aspect 47 is a method of wireless communication for implementing any of aspects 1 to 46.

Aspect 48 is an apparatus for wireless communication including means for implementing any of aspects 1 to 46.

Aspect 49 is a computer-readable medium (e.g., a non-transitory computer-readable medium) storing computer executable code, where the code when executed by a processor causes the processor to implement any of aspects 1 to 46.

What is claimed is:

1. An apparatus for wireless communication at a user equipment (UE), comprising:
    a memory; and
    at least one processor coupled to the memory and, based at least in part on information stored in the memory, the at least one processor is configured to:
        transmit, to at least one of a network node or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE; and
        receive, from the network entity, a response to at least one of the indication of the one or more future network slices, the indication of the one or more current network slices, or the indication of the one or more past network slices.

2. The apparatus of claim 1, wherein the indication of the one or more future network slices includes at least one of: a probability of usage of the one or more future network slices, a weight factor for the one or more future network slices, or a priority index for the one or more future network slices.

3. The apparatus of claim 1, wherein the indication of the one or more current network slices includes at least one of: a weight factor for the one or more current network slices or a priority index for the one or more current network slices.

4. The apparatus of claim 1, wherein the indication of the one or more past network slices includes a history of usage of the one or more past network slices.

5. The apparatus of claim 4, wherein the history of usage of the one or more past network slices includes at least one of: an amount of previous usage of the one or more past network slices in a duration, a weight factor for the one or more past network slices, or a priority index for the one or more past network slices.

6. The apparatus of claim 1, wherein the indication of the one or more future network slices corresponds to a list associated with network slice selection assistance information (NSSAI).

7. The apparatus of claim 6, wherein the list associated with the NSSAI corresponds to updated requested NSSAI or a wish list for NSSAI.

8. The apparatus of claim 6, wherein the list associated with the NSSAI corresponds to an expansion of requested NSSAI or an adjustment of requested NSSAI.

9. The apparatus of claim 1, wherein the at least one processor is further configured to:
    store a history of usage of the one or more past network slices prior to transmitting the indication of the one or more past network slices.

10. The apparatus of claim 1, wherein the at least one processor is further configured to:
    calculate a probability of usage of the one or more future network slices prior to transmitting the indication of the one or more future network slices.

11. The apparatus of claim 1, wherein the response is an allowance, a rejection, an acknowledgement (ACK), or a negative ACK (NACK).

12. The apparatus of claim 1, wherein the at least one processor is further configured to:
    transmit, to the network node based on the response, a message associated with at least one of the one or more future network slices, the one or more current network slices, or the one or more past network slices.

13. The apparatus of claim 12, wherein the message is a radio resource control (RRC) message or a non-access stratum (NAS) message.

14. The apparatus of claim 13, wherein the RRC message is a UE assistance information (UAI) message, an RRC complete message, or a new RRC message.

15. The apparatus of claim 1, wherein the one or more future network slices are associated with a slice priority, the one or more current network slices are associated with the slice priority, and the one or more past network slices are associated with the slice priority.

16. The apparatus of claim 1, further comprising a transceiver coupled to the at least one processor, wherein the network entity is an access and mobility management function (AMF), a session management function (SMF), or a network data analytics function (NWDAF).

17. An apparatus for wireless communication at a network entity, comprising:
a memory; and
at least one processor coupled to the memory and, based at least in part on information stored in the memory, the at least one processor is configured to:
receive, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE; and
transmit, to at least one network node, network slice selection assistance information (NSSAI) based on at least one of the indication of the one or more future network slices, the indication of the one or more current network slices, or the indication of the one or more past network slices.

18. The apparatus of claim 17, wherein the indication of the one or more future network slices includes at least one of: a probability of usage of the one or more future network slices, a weight factor for the one or more future network slices, or a priority index for the one or more future network slices, and wherein the indication of the one or more current network slices includes at least one of: a weight factor for the one or more current network slices or a priority index for the one or more current network slices.

19. The apparatus of claim 17, wherein the indication of the one or more past network slices includes a history of usage of the one or more past network slices, wherein the history of usage of the one or more past network slices includes at least one of: an amount of previous usage of the one or more past network slices in a duration, a weight factor for the one or more past network slices, or a priority index for the one or more past network slices.

20. The apparatus of claim 17, wherein the indication of the one or more future network slices corresponds to a list associated with the NSSAI.

21. The apparatus of claim 20, wherein the list associated with the NSSAI corresponds to updated requested NSSAI or a wish list for NSSAI, or wherein the list associated with the NSSAI corresponds to an expansion of requested NSSAI or an adjustment of requested NSSAI.

22. The apparatus of claim 17, wherein the at least one processor is further configured to:
configure a network slice structure based on at least one of the one or more future network slices, the one or more current network slices, or the one or more past network slices.

23. The apparatus of claim 22, wherein the network slice structure is associated with a radio resource management (RRM) decision at the network entity.

24. The apparatus of claim 23, wherein the RRM decision is associated with a decision to handover or redirect to at least one other network node, at least one other frequency, or at least one other radio access technology (RAT).

25. The apparatus of claim 17, wherein the at least one processor is further configured to:
transmit, to the at least one UE, a response to at least one of the indication of the one or more future network slices, the indication of the one or more current network slices, or the indication of the one or more past network slices, wherein the response is an allowance, a rejection, an acknowledgement (ACK), or a negative ACK (NACK).

26. The apparatus of claim 17, wherein the one or more future network slices are associated with a slice priority, the one or more current network slices are associated with the slice priority, and the one or more past network slices are associated with the slice priority.

27. The apparatus of claim 17, further comprising a transceiver coupled to the at least one processor, wherein the network entity is an access and mobility management function (AMF), a session management function (SMF), or a network data analytics function (NWDAF).

28. The apparatus of claim 27, wherein the network entity is the AMF, wherein the at least one processor is further configured to:
receive, from the SMF, network slice information associated with at least one of the one or more future network slices, the one or more current network slices, or the one or more past network slices; and
transmit, to the NWDAF, an indication of the received network slice information.

29. A method of wireless communication at a user equipment (UE), comprising:
transmitting, to at least one of a network node or a network entity, at least one of an indication of one or more future network slices, an indication of one or more current network slices, or an indication of one or more past network slices, the one or more future network slices corresponding to network slices for potential future use by the UE, the one or more current network slices corresponding to network slices that are currently used by the UE, the one or more past network slices corresponding to network slices that were previously used by the UE; and
receiving, from the network entity, a response to at least one of the indication of the one or more future network slices, the indication of the one or more current network slices, or the indication of the one or more past network slices.

30. A method of wireless communication at a network entity, comprising:
receiving, from at least one user equipment (UE), at least one of an indication of one or more future network slices, an indication of one or more current network slices, or an indication of one or more past network slices, the one or more future network slices corresponding to network slices for potential future use by the at least one UE, the one or more current network slices corresponding to network slices that are currently used by the UE, the one or more past network slices corresponding to network slices that were previously used by the at least one UE; and transmitting, to at least one network node, network slice selection assistance information (NSSAI) based on at least one of the indication of the one or more future network slices, the indication of the one or more current network slices, or the indication of the one or more past network slices.

\* \* \* \* \*